United States Patent [19]

Soulliard et al.

[11] Patent Number: 4,463,221

[45] Date of Patent: Jul. 31, 1984

[54] AUTOMATIC RADIO TELEPHONE ENCODER/DECODER

[75] Inventors: Charles Soulliard; Herschel W. Ward; Arthur D. Gass; Andrew M. Hudor, Jr., all of Tucson, Ariz.

[73] Assignee: Midian Electronics, Inc., Tucson, Ariz.

[21] Appl. No.: 250,076

[22] Filed: Apr. 1, 1981

[51] Int. Cl.$^3$ .................... H04M 1/26; H04Q 7/04
[52] U.S. Cl. .................. 179/2 EB; 179/81 R; 179/90 K; 179/90 BB
[58] Field of Search ............... 179/2 E, 2 EA, 2 EB, 179/2 EC, 81 R, 90 K, 90 B, 84 VF, 90 BB, 90 BD; 455/35–38

[56] References Cited

U.S. PATENT DOCUMENTS

| | | |
|---|---|---|
| 3,336,444 | 8/1967 | Piechocki . |
| 3,470,326 | 9/1969 | Gretteberg . |
| 3,510,777 | 5/1970 | Gordon . |
| 3,778,557 | 12/1973 | Frederiksen . |
| 3,806,663 | 4/1974 | Peek et al. ................ 179/2 EB |
| 3,808,537 | 4/1974 | Sarati et al. ............... 179/2 EB X |
| 4,039,760 | 8/1977 | Gregory et al. . |
| 4,053,717 | 10/1977 | Snider . |
| 4,179,588 | 12/1979 | Oliveira . |

*Primary Examiner*—G. Z. Rubinson
*Assistant Examiner*—W. J. Brady
*Attorney, Agent, or Firm*—Harold A. Gell, Jr.

[57] ABSTRACT

An automatic radio telephone encoder/decoder including a microcomputer programmed to decode incoming dial codes and generate outgoing radio telephone functions and dial codes in response to received signals or keypad activation is presented in combination with control circuitry activated by the microcomputer which is maintained in an off condition except when called upon to perform encoding or decoding functions by a keyboard input means or signals received by the radio telephone.

37 Claims, 4 Drawing Figures

AUTOMATIC RADIO TELEPHONE ENCODER/DECODER

TECHNICAL FIELD

This invention relates to an automatic radio telephone encoder/decoder which utilizes a microcomputer to create and control the interface between a radio telephone station and an automatic radio telephone system. The decoder portion of the interface system decodes incoming telephone numbers and in response to a proper sequence of digits, provides a coded response to indicate that the proper radio telephone station has been reached and establish a communication link. The encoder portion of the interface system creates coded signals which are transmitted by the associated radio telephone station to enable the station to engage an automatic radio telephone system by securing a channel for its unique use and transmitting over the secured channel a code representing the telephone number of the station which is to be reached.

BACKGROUND OF THE INVENTION

The device disclosed herein is adapted to function with automatic radio telephone (ART) systems which are tied directly into telephone transmission networks. ART systems permit a user to place a call by direct dialing via a standard telephone or radio telephone and reach a standard telephone station or radio telephone station. If the number dialed is a radio telephone station, the area code routes the call in the standard way and the exchange code identifies a radio telephone terminal which transmits the last four digits of the dialed number as a user identification code. In some systems, the area code identifies a radio telephone terminal which transmits the last seven digits of the dialed number as a user identification code. This code, either four or seven digits, is in the form of a pulsed 2805 HZ tone on a radio telephone channel carrier frequency.

Radio telephone receivers tuned to the channel decode the pulses and if they represent the proper telephone number, a ring tone is generated. The 2805 HZ tone remains on the channel carrier until the telephone call is terminated. After being pulsed and providing the dialing code, the tone remains constant and functions as a busy tone which blocks all other channel users except the one which received the call. The channel is protected against other stations transmitting as well as receiving to provide privacy on used channels. Notch filters are used in the audio section of the system to mask or block out the 2805 HZ busy tone so that it does not interfere with normal use of the radio telephone link completed between stations.

The radio telephone station which decodes the number sends an identification coded signal back to the calling station to indicate that the number has been decoded by the party called. The signal is decoded by the call originating station which then locks up the channel until the call is terminated as signaled by a positive disconnect code signal. Upon receiving a positive disconnect signal, the system is automatically shut down to free the channel for other uses.

One ART system for which the present invention is adapted to function in conjunction with is the Secode Modular Automatic Radio Telephone System provided by Secode Electronics of Dallas, Tex. A number of encoder/decoder systems are available to function in conjunction with that system as well as other ART systems but they all create excessive power drain on battery systems providing power to associated mobile receiver transmitters.

In addition to creating excessive power drains, existing encoder/decoders require full duplex operation, do not provide audio or visual ques to an operator to indicate when a channel has been secured, when keyboard entries are being made, when a channel is busy or when a station has been called.

OBJECTIVE OF THE INVENTION

In view of the preceding, it is a primary objective of the present invention to provide an automatic radio telephone encoder/decoder utilizing a microcomputer in combination with a power saving means which inhibits power application to the microcomputer except during the specific periods of time when the computer is required.

A primary objective of this invention is to provide a radio telephone encoder/decoder which will permit automatic simplex operation.

A further objective of the present invention is to provide an encoder/decoder which incorporates a notch filter to remove busy tones from received audio signals.

A further objective of the present invention is to provide a decoder which has the capability of decoding four digit or seven digit phone numbers.

A still further objective of the present invention is to provide a yellow call indicator lamp that is activated in response to the system decoding a proper phone number.

Another objective of the present invention is to provide an encoder/decoder wherein the phone number to which the system is to be responsive to is set by ANI strapping.

A still further objective of the present invention is to provide a system which decodes signalling transmitted over voice channels.

Another objective of the present invention is to provide an automatic telephone encoder/decoder which provides a choice of a plurality of ring tones or signals which may be selected as a user option.

A still further objective of the present invention is to provide an encoder/decoder which provides an output capable of activating a remote signalling means for a predetermined period of time.

Another objective of the present invention is to provide a busy lock out signal which inhibits push-to-talk and monitoring during the presence of a busy tone.

A still further objective of the present invention is to provide a busy tone when any keyboard entry is attempted on a used channel.

Another objective of the present invention is to provide a red busy indicator lamp for indicating to a potential user that a channel is busy.

Another objective of the present invention is to provide a yellow call indicator lamp which will indicate to a user that the station has been called up.

Another objective of the present invention is to provide a lock out means for the power supply to the microcomputer which will keep it from receiving power during the presence of a busy signal which occurs after dialing and during the duration of the telephone call.

Another objective of the present invention is to provide a signal which will squelch an associated receiver and the internal notch filter to minimize undesired reception.

A still further objective of the present invention is to provide a system capable of producing ten ANI call routing codes and positive disconnect signals.

Another objective of the present invention is to provide a hang-up hook switch positive disconnect for mobile control heads.

A still further objective of the present invention is to provide an automatic reset for call-up, push-to-talk pulser, and muting following a positive disconnect.

A still further objective of the present invention is to provide a pulse dialing means for a 2805 HZ tone capable of operating at ten pulses per second or twenty pulses per second at user option.

A still further objective of the present invention is to provide a pulse dialing system or alternately a touch-tone dialing system.

Another objective of the present invention is to provide a means to store a dialed number so that it may be redialed on command.

A still further objective of the present invention is to provide an encoder/decoder that provides an automatic push-to-talk output control function.

Another objective of the present invention is to provide a delayed ANI signal 100 milliseconds after initial push-to-talk to provide lock up time for satellite receiver voting systems.

Another objective of the present invention is to provide a synchronous push-to-talk pulser which will key a transmitter during receive for 650 milliseconds every nine seconds to refresh the automatic radio telephone system COR circuit which terminates a telephone link when not used.

Another objective of the present invention is to provide a green indicator lamp for indicating when transmission occurs.

Another objective of the present invention is to provide an audible tone in response to each keyboard entry.

Another objective of the present invention is to provide a busy tone with each keyboard entry made on a marked busy channel currently being used by another party.

The preceding, and other objectives of the present invention will become apparent in light of the specification, drawings and claims which follow.

BRIEF SUMMARY OF THE INVENTION

The automatic radio telephone encoder/decoder disclosed herein employs a microcomputer which is programmed to accomplish, through associated circuitry, the various decoder functions and encoder functions required for a radio telephone to function in an automatic radio telephone system environment where dialing codes are modulated on audio dialing code carrier tones.

The systems is programmed to decode pulsed dialing codes and encode pulsed and/or touch-tone dialing codes, alert a user when his number is decoded and via audio and visual means provide an indication as to the status of the communications channel which the radio telephone is tuned. In response to keypad operation, the system provides telephone codes acceptable by related system networks.

The controlling program within the computer in combination with associated circuitry keeps the microcomputer de-energized except during the actual periods of time when the services of the computer for encoding or decoding are required. The system also provides an automatic refresh signal that is transmitted periodically while the system is receiving or listening for incoming data to prevent the network terminal from automatically disconnecting the circuit through its COR delay disconnect during simplex operations.

A keypad provides a means to enter telephone number data and related codes in the microcomputer and also contains a green indicator which is energized during transmission, a red indicator which is energized when the channel is busy and a yellow indicator which is energized when the system has been called up.

DETAILED DESCRIPTION OF THE INVENTION

Figure 1:
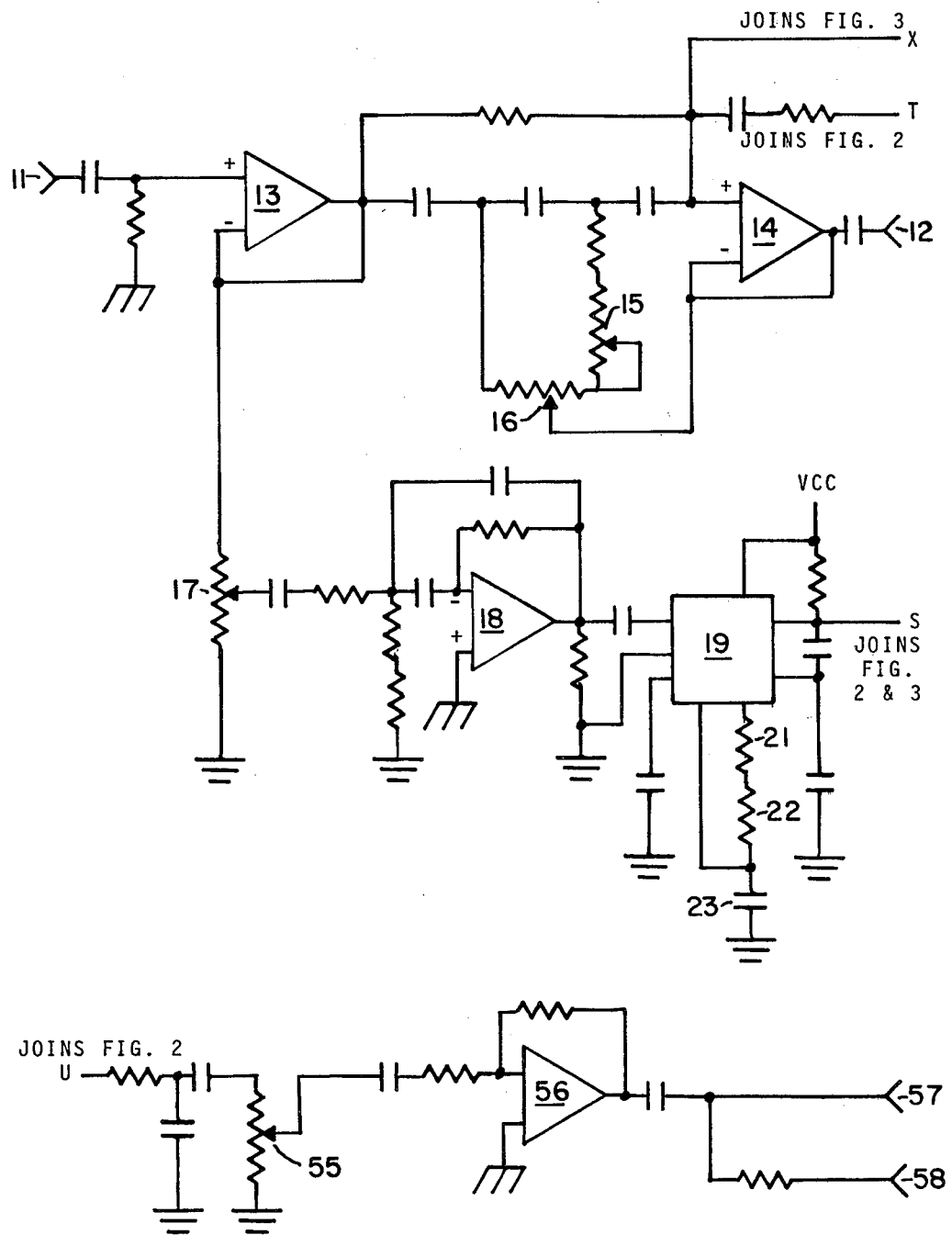
FIG. 1 is a schematic of the audio circuits.

In its normal quiescent state the microcomputer of the encoder/decoder is off. However, when the system is connected to a radio telephone receiver-transmitter, the receiver audio line is interrupted and patched into the encoder/decoder at audio input jack 11 of FIG. 1 and returned via audio output jack 12. Thus when a 2805 HZ tone is received, it is applied to the positive input of operational amplifier 13. The output of operational amplifier 13 is applied to a bridge differentiator filter comprised of operational amplifier 14 and related resistor and capactive components. This differentiator blocks the 2805 HZ tone but passes all other audio signals back to the receiver audio circuits via output jack 12 as previously stated. Potentiometers 15 and 16 provide a means for adjusting the bridge differentiator filter for the precise frequency to be blocked.

The audio amplitude of the signal emerging from the output of operational amplifier 13 is controlled by potentiometer 17. The variable tap on potentiometer 17 couples the 2805 HZ tone to a band pass filter comprised of operational amplifier 18 and its related resistive and capacitive components. This filter functions as a bandpass filter which passes only the 2805 HZ tone. Hence the filters comprised of operational amplifier 14 and related components and operational amplifier 18 and related components function to split received audio into two channels, a first channel containing everything except the 2805 HZ tone and a second channel containing only the 2805 HZ tone.

The 2805 HZ tone emerging from operational amplifier 18 is applied to tone decoder 19, which in the disclosed embodiment is a type L567 tone decoder made by EXAR. The output at pin 8 of tone decoder 19 goes low in respone to the application of a 2805 HZ tone to pin 3 as a function of the timing resistors 21 and 22 and timing capacitor 23.

Figure 2:
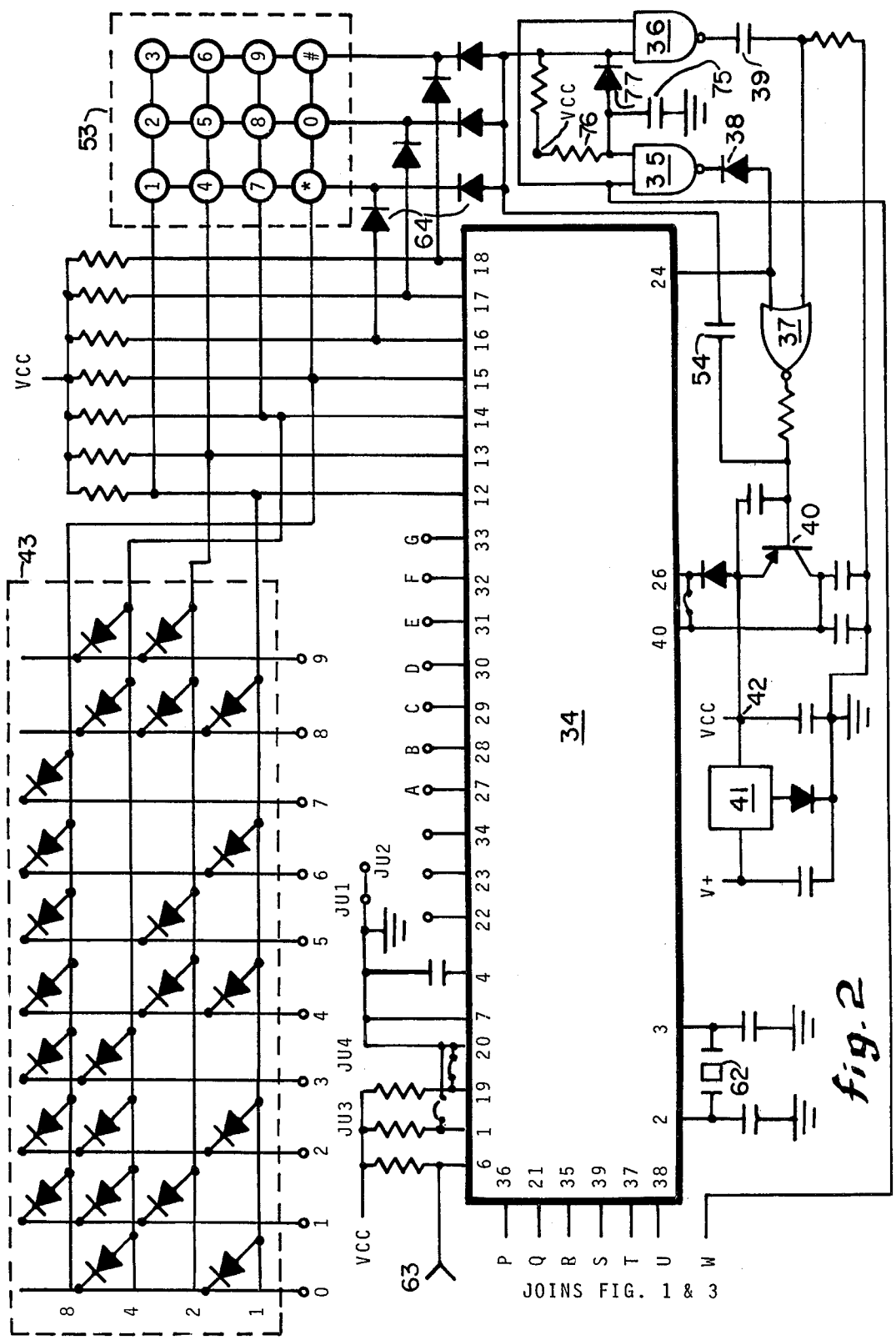
FIG. 2 is a schematic of the microcomputer and power control means.
Figure 3:
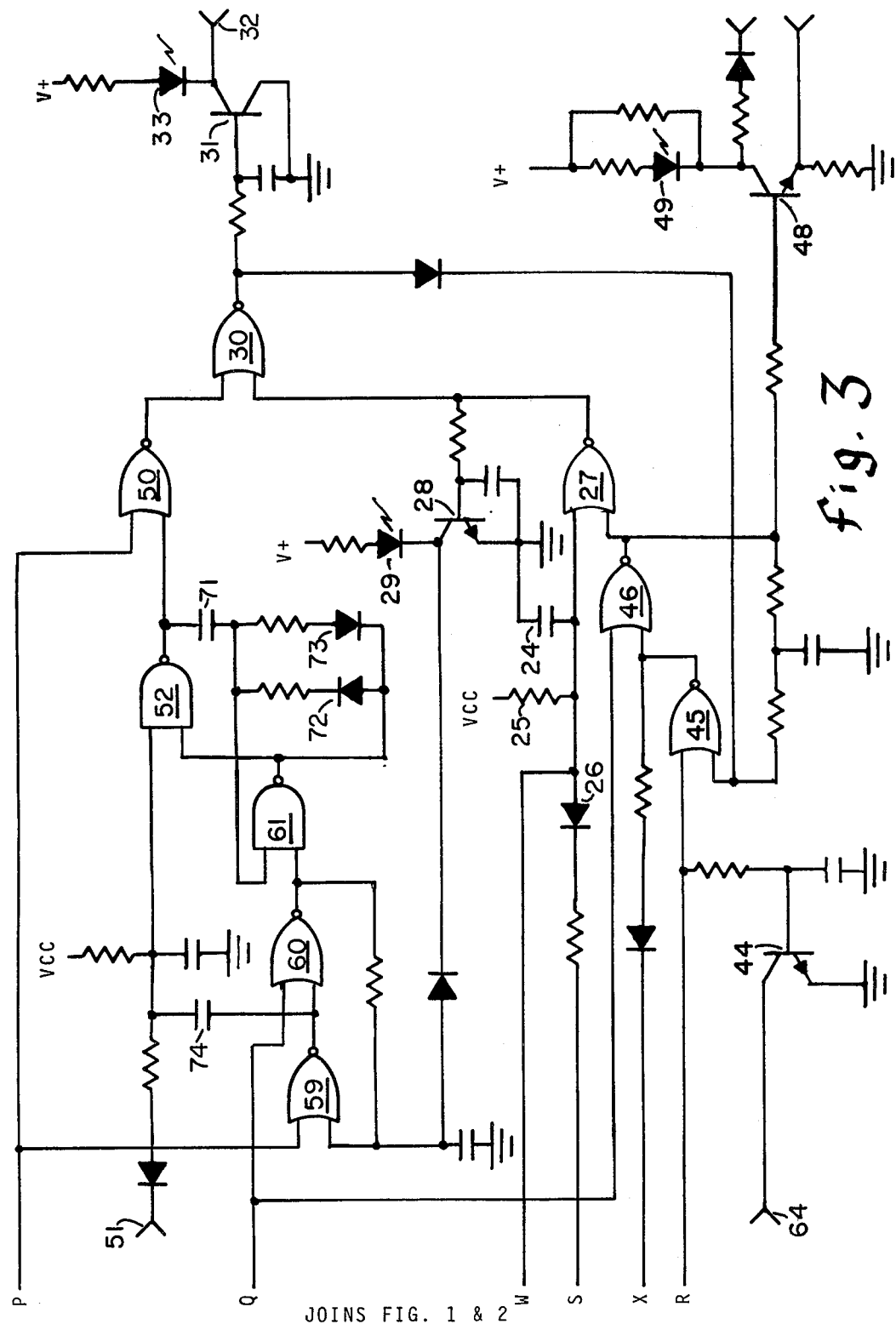
FIG. 3 is a schematic of the control logic circuits.

The low output of tone decoder 19 is applied via isolation diode 26 of FIG. 3 to a timing circuit comprised of capacitor 24 and resistor 25. This RC timing network is coupled to one input of NOR gate 27. (All NOR gates illustrated in FIGS. 2 and 3 may be of a similar type such as CD4001). The low at one input of NOR gate 27 causes the output to go high and turn on transistor 28. This energizes light emitting diode 29 which is adapted to provide a real indication that a 2805

HZ tone is being received. This indicates that the channel is busy.

The high output of NOR gate 27 is also applied to one input of NOR gate 30. This causes the output of NOR gate 30 to go low and inhibit transistor 31 which controls the push-to-talk output at jack 32 and light emitting diode 33 which provides a green indication of transmission.

The output signal at pin 8 of tone decoder 19 is also applied to pin 39 of the microcomputer 34 of FIG. 2. In the disclosed embodiment, the microcomputer is a type 8048 system and it is programmed in accordance with instructions provided later in this specification to decode pulsed input data applied to pin 39. However, as previously stated microcomputer 34 is normally maintained in an off state. The initial negative going pulse or phase transition which occured at pin 8 of tone decoder 19 when the 2805 HZ signal was first received is delayed by resistor 25 and capacitor 24 and then coupled to one input of NAND gate 35 and one input of NAND gate 36 of FIG. 2. (These NAND gates and the other NAND gates illustrated in FIGS. 2 and 3 may be of a common type such as CD4093). The negative potential at the input of NAND gate 35 causes the output of that NAND gate to be driven high but due to the blocking diode 38, the high at the output of NAND gate 35 has no effect on NOR gate 37. The low at one input of NAND gate 36 causes that NAND gate to go high also and commence charging capacitor 39. As capacitor 39 begins charging, the associated input to NOR gate 37 goes high and the output of NOR gate 37 goes low which causes transistor 40 to begin conducting. This supplies 5 volts from regulated power source 41 to microcomputer 34. If a low input from tone decoder 19 is present at input pin 39 of microcomputer 34 at this time, pin 24 of microcomputer 34 will go high for a period not exceeding three seconds. If within that three seconds, a transition occurs at the input to pin 39 from a dialing code pulse, the repeat transition from high to low will have the effect of causing the three second period to be refreshed so that the high at pin 24 of microcomputer 34 will be present for another three seconds. It should be noted at this point that the program for microcomputer 34 contains instructions whereby if the code creating the three second keep-alive potential at pin 24 is detected as being an erroneous pulse, the keep-alive potential at pin 24 is immediately removed.

When transistor 40 was first caused to start conducting by the output of NAND gate 36 going high, capacitor 39 began to charge. Capacitor 39 charges relatively rapidly with respect to the three second keep-alive potential duration and when capacitor 39 is charged, the associated input to NOR gate 37 goes low. Therefore NOR gate 37 will not receive a high input from NAND gate 36 until such time as the dialing tone carrier detected by tone detector 19 is interrupted long enough for capacitor 39 to become substantially discharged. Thus the only way for the computer to receive constant power and perform its decoding functions is for a keep-alive positive potential to be applied to the other input to NOR gate 37 from pin 24 of the computer. Three seconds after the final digit of the incoming code, the keep-alive potential at pin 24 drops to low and the computer is shut down. If the 2805 HZ signal is still present on the channel because the channel is active, the computer will still not be energized because the high output of NAND gate 36 is blocked by the fully charged capacitor 39 which functions as a means to inhibit the reactivation of the microcomputer. However, depression of any key on the key panel 53 will cause a negative potential to be reflected through capacitor 54 and this will cause transistor 40 to begin conducting. Once transistor 40 begins conducting, the computer will turn on for three seconds due to the low provided by tone decoder 19 to input pin 39. This period of time is sufficient for the computer to generate the codes required for a call termination which will free the channel and allow capacitor 39 to discharge so that the system will be ready to respond to a second call.

The needed features provided by capacitor 39 are not sufficient to ensure that the computer will remain shut off during a complete call due to various tone interrupts as might be caused by a mobile unit travelling under a bridge etc.. Therefore, to compensate for such problems a crow bar circuit is included. This crow bar circuit includes the RC network comprised of capacitor 75, resistor 76 and diode 77. When VCC or the regulated 5 volt potential is made available at distribution point 42 to be applied to the microcomputer, it is also applied to this RC network and causes capacitor 75 to commence charging. The values of the resistor 76 and capacitor 75 are selected such that the capacitor will require approximately eighteen seconds to charge. Once charged, the output of NAND gate 35 goes low which causes diode 38 to effectively ground the keep-alive potential at pin 24 so that the system cannot be turned on again via NAND gate 36 as might be caused by a brief signal interruption which would permit capacitor 39 to discharge and then be recharged again. If this occurs, the computer would come on the line for a very brief period of time but the keep-alive voltage would not be present and therefore the microcomputer would immediately shut down. This crow bar function is bypassed as prevlsouly explained by depression of any one of the keys on the keypad through capacitor 54 to that the computer can be brought back on line to send the terminating code when a call has been terminated.

The regulated power source 41 normally produces 5.6 volts which is dropped by the resistance of transistor 40 to a regulated 5 volts. The 5 volts is present at voltage distribution point VCC indicated by numeral 42 in FIG. 2 and is applied to the power inputs pins 26 and 40 of microcomputer 34 under conditions previously explained.

When the system is in its quiescent, normally cut off state and no detected tone signal is creating a low output from tone detector 19, the system may be brought on line by depressing any one of the keys on keypad 53. The keys on the keypad function to connect a ground potential to one input of NAND gate 36. This causes the output of NAND gate 36 to go high and while capacitor 39 is charging, a high input is applied to the associated pin of NOR gate 37 which causes its output to go low and cause transistor 40 to start conducting so that a regulated 5 volts is applied to the system as previously described. However, in this instance a low potential is not present at input pin 39 of the microcomputer because the tone decoder has not detected a 2805 HZ signal. In this situation, the microcomputer is programmed to provide a keep-alive potential or high at pin 24 for a period of seven seconds. It is anticiapted that the seven second keep-alive potential at pin 34 will maintain a low output at NOR gate 37 for a period sufficiently long to enable the dialing of a telephone number.

If the received pulsed code represents the telephone number for which the system has been strapped, a ring signal is provided at output pin 37 of microcomputer 34. This output pin is connected to the bridge differentiator of FIG. 1 from where it is coupled via operational amplifier 14 to the audio output jack 12. The computer is programmed to provide one of a plurality of output ring tones as selected by connecting the jumper from pin 34 of microcomputer 34 to either one of pins 0 or 1 through 7 of diode matrix 43 of FIG. 2.

The microcomputer 34 is programmed to provide a standard Bell System ring tone if the jumper connected to pin 34 of microcomputer 34 is not connected. However, if it is connected the ring tone will be a 2400 HZ pulsating ring tone or one of the following tunes depending on jumper wire connection:

Dixie, Shave and a Haircut Two Bits, Westminster chime, William Tell Overture, Theme from Laurel and Hardy, America, or a bugle call.

The selected ring tone will be inhibited by the band pass filter including operational amplifier 18 but it will pass through the bridge differentiator filter including operational amplifier 14 and thus it will be applied to the audio circuit of the radio telephone.

In addition to the ring tone, microcomputer 34 will provide a high level output at pin 35 for a period of two seconds. This output will cause transistor 44 of FIG. 3 to conduct and provide an activation signal to a remote indicator such as a light or horn. In mobile units, this signal is generally connected to the automobile horn to provide an alert to an operator not in his vehicle at the time the signal is received.

The positive output from pin 35 of microcomputer 34 is also applied to one input of NOR gate 45 which, combined with NOR gate 46 functions as a relatively slow flip-flop that will inhibit the bridge differentiator filter circuit including operational amplifier 14 via diode 47 so long as the output of NOR gate 30 is low so that messages for other stations will not be passed to the speaker of the radio telephone. However, when the flip-flop is reset by the output of pin 35 of microcomputer 34 as a function of the microcomputer having properly decoded an incoming telephone call, the bridge differentiator filter circuit is not inhibited and the output of NOR gate 46 goes high to cause transistor 48 to begin conducting. When transistor 48 is conducting, light emitting diode 49 is energized and a yellow visual indication of a call is given. The high at the output of NOR gate 46 is also applied to one input of NOR gate 27 which causes the output of NOR gate 27 to go low. This turns off transistor 28 and the busy LED 29 and enables NOR gate 30 so that when it receives a low from NOR gate 50, it will provide a high output that will cause transistor 31 to begin conducting. This provides a push-to-talk output at pin 32 and energizes LED 33 which provides a visual green indication of transmission.

The output of NOR gate 50 is driven low by activation of the push-to-talk button via push-to-talk input jack 51. This applies a low level to one input of NAND gate 52 which causes a high output to be produced by that NAND gate which is coupled to one input of NAND gate 52 which causes a high output to be produced by that NAND gate which is coupled to one input of NOR gate 50 and thus the second low is provided to true NOR gate 30.

The microcomputer 34 of FIG. 2 is programmed to decode either a four or seven digit telephone call and as a function of jumper JU 3 connecting pin 1 to ground causes the yellow call light to be activated in response to both a four and seven digit code instead of the standard response of a yellow call light only for a seven digit code. The actual phone number programming is accomplished by connecting jumpers A through G from the microcomputer 34 to the jumper connections 0 through 9 of the diode matrix 43. For instance, to program the system to be responsive to a telephone number 885-1234, the following jumper or strap connections would be made: jumpers A and B connected to diode matrix connection 8, C to 5, D to 1, E to 2, F to 3, and G to 4.

When the system is functioning as an encoder, that is when a telephone call is being originated by the associated radio telephone, activation of * on keypad 53 followed by any single digit causes the microcomputer 34 to encode the number patched in from the diode matrix 43 and convert it to a phase encoded 1402.5 HZ ASCII hamming code at pin 38 of the microcomputer. This code is generated and transmitted to the system network to identify the remote equipment generating the response or initiating a call. Depression of additional keys creates a ground connection at 2 of pins 13 through 18 of microcomputer 34 which represents a 2 out of 7 code which is encoded by the microcomputer as a 2805 HZ pulsed dialing code and applied to output pin 38. However, as previously indicated the microcomputer 34 is normally in an off condition. When a button on keypad 53 is depressed, capacitor 54 is grounded and this causes a voltage spike to be applied to the base of transistor 40. This causes transistor 40 to conduct and the microcomputer will be energized for a period of seven seconds as previously described due to the application of a keep-alive voltage to NAND gate 37 from pin 24 of the microcomputer.

In response to a user keying in * 1, 2, 3 or 4, an identification code is sent to the network system which recalls from its memory and dials user preselected telephone numbers. The system is also programmed to remember the last dialed telephone number so that it may be recalled. A * 7 input provides automatic connection to a phone exchange, * 8 activates a loop back so that another radio telephone unit may be called, * 9 provides an outside line where the user accomplishes his own dialing via keypad 53 and * 0 calls the operator for assistance. If it is desired to terminate a telephone call, the * # sequence may be entered and the radio telephone interconnection will be immediately terminated without waiting for the COR timer to automatically drop out after the prescribed delay period.

It should be noted that once the system is locked on a channel, the input to NAND gate 36 from the tone decoder via diode 26 will prevent the NAND gate from turning on transistor 40 via NOR gate 37 after the initial input spike when the system is in the decoding mode. Thus when the system is in an encoding mode, after the initial turn on which can be either via capacitor 54 or capacitor 39, the computer will shut down and remain in an off condition. Thus when * # is selected to terminate a call, the computer would be in an off condition and not responsive. However depression of one of the keys on keypad 53 will cause a voltage spike through capacitor 54 which will cause transistor 40 to conduct regardless of the output of NOR gate 37 or the mode of operation of the system.

The codes generated by microcomputer 34 in response to answering a proper incoming call or in response to activation of the keypad when originating a call or terminating a call are applied to pin 38 of microcomputer 34. This pin couples the coded 2805 HZ and 1402.5 HZ signals via an integrator and level control circuit including potentiometer 55 to output amplifier 56 which drives the high impedance output jack 57 and the low impedance output jack 58. The appropriate output jack, 57 or 58, is coupled to the audio section of the radio telephone transmitter.

Two hundred fifty milliseconds before the code to be transmitted is applied to pin 38 of the microcomputer, pin 36 of the microcomputer goes high. This pin is coupled to NOR gate 50 of FIG. 1 which provides a low output in response to the high input and trues NOR gate 30 to automatically activate the transmitter circuit. The transmitter circuit is activated via the push-to-talk circuit before the code is presented for transmission so that systems utilizing voting receivers will have time to select the proper receiver to respond.

The positive pulse applied at pin 36 of microcomputer 34 is also applied to one input of NOR gate 59 which forms a flip-flop with NOR gate 60. The effect of the positive pulse at the input of NOR gate 59 causes the output of NOR gate 60 to go high and this enables NAND gate 61. When enabled, NAND gate 61 functions with NAND gate 52 as a non-symmetrical oscillator which is an automatic refresh pulse generator with a 20 to 1 duty cycle. It sends a pulse having a width exceeding 500 milliseconds every eight to nine seconds as set by the time constant provided by capacitor 71 and resistors 72 and 73 which vary the pulse width and repetition rate. This automatic refresh pulse is sent out periodically to prevent the automatic COR disconnect from terminating the radio telephone circuit if the listening period exceeds the COR delay. The refresh pulse generator is turned on by the output of a flip-flop comprised of NOR gates 59 and 60 which are controlled by the push-to-talk output at pin 36 of microcomputer 34. The refresh pulse generator remains on during the length of the call after the microcomputer has shut down as previously explained to conserve power. The refresh pulse generator uses low power drain CMOS circuitry to minimize battery drain. The refresh pulse generator is synchronized to the push-to-talk output at input jack 51 and by microcomputer 34 through its push-to-talk output at pin 36. An output at pin 36 of the microcomputer causes the flip-flop comprised of NOR gates 59 and 60 to provide an input from the output of NOR gate 59 via capacitor 74 to the push-to-talk input of NAND gate 52. The output of the flip-flop at the output of NOR gate 60 enables the refresh pulse generator and causes it to continue producing a refresh pulse which energizes the push-to-talk circuit at eight to ten second intervals continually until the flip-flop is reset, even though the computer is no longer on the line.

Crystal 62 provides a timing or clock circuit for microcomputer 34.

The microcomputer is programmed to interpret an input at pin 6 as a positive disconnect signal and in normal installations, this pin is connected to a hangup hook switch so that when the microphone is hung up, the microcomputer responds as if the positive disconnect signal * # was inserted by the keypad 53 and the call is terminated.

To prevent excessive battery drain, the microcomputer 34 is programmed to remove the keep-alive potential at pin 24 during the decode mode if a code pulse is not received within three seconds of power up. This prevents the computer from staying on line when the channel is marked busy with the 2805 HZ dialing tone. A further battery saving feature is included in the microcomputer program wherein the keep-alive potential at pin 24 of the microcomputer is terminated during the decode mode as soon as an erroneous pulse position is detected. Therefore, when the microcomputer begins to decode an incoming signal, the computer will remain on until the first wrong digit is detected and then it will immediately shut down with the red LED indicator 29 indicating a busy channel.

The program for microcomputer 34 causes it to provide an audio tone output at pin 37 each time a key is depressed on keypad 53. This provides an audio indication of keypad activation.

Figure 4:
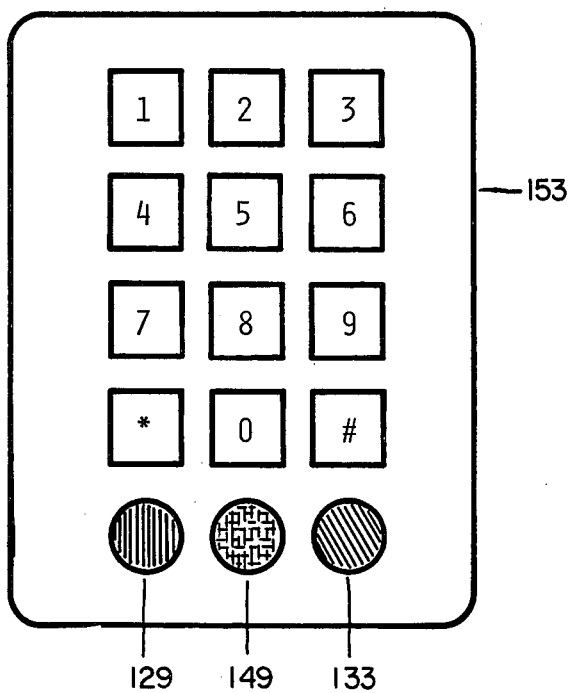
FIG. 4 is a top view of the present invention.

FIG. 4 illustrates a preferred embodiment of the present invention wherein the electronic components of the system are incorporated in a keypad housing 153. A red busy indicator 129 illuminated by diode 29 of FIG. 3, a yellow channel capture indicator 149 illuminated by diode 49 of FIG. 3, and a green transmit indicator 133 illuminated by diode 33 of FIG. 3 are positioned on the face of the housing.

Jumper JU 1, when installed between ground and pin 22 on microcomputer 34 changes the dialing speed from ten pulses per second to twenty pulses per second for radio telephone systems located in ESS offices.

Jumper JU 2, when installed between ground and pin 23 of microcomputer 34 disables the annunciated keyboard beat tones and the busy tone normally provided at output pin 37 of the microcomputer.

Jumper JU 4, when installed between ground and pin 19 disables the pulse code dialing system within the microcomputer and activates the microcomputer to control an operational touch-tone encoder.

In the exemplary system presented herein, the microcomputer 34 is a standard type 8048 microcomputer programmed to provide the encoding, coding and control functions described herein in accordance with the following instructions:

| LOC | OBJ | LINE | | SOURCE STATEMENT | | |
|---|---|---|---|---|---|---|
| | | | 1 | $TITLE('WISER - MIDIAN ELECTRONICS ENCODER/DECODER SYSTEM - 14 OCT 80') | | |
| 0000 | | | 2 | | ORG | 000H |
| 0000 | 040D | | 3 | | JMP | WAKEUP |
| | | | 4 | | | |
| 0007 | | | 5 | | ORG | 007H |
| | | | 6 | $INCLUDE(:F1:TMRINT) | | |
| | | = | 7 | ; | | |
| | | = | 8 | ; TMRINT - TIMER INTERRUPT HANDLING ROUTINE. | | |
| | | = | 9 | ; | | |
| 0007 | C5 | = | 10 | TMRINT: | SEL | RB0        ; IN CASE WE'RE IN 'DELAY' |
| 0008 | EF0C | = | 11 | | DJNZ | R7,TMRAD0  ; DECREMENT THE REMAINING TIME. |
| 000A | 44D1 | = | 12 | | JMP | SLEEP      ; TIMES UP - GO TO SLEEP. |
| 000C | 93 | = | 13 | TMRAD0: | RETR | ; STILL TIME LEFT - RETURN. |
| | | | 14 | | | |
| | | | 15 | $EJECT INCLUDE(:F1:WAKEUP) | | |
| | | = | 16 | ; | | |
| | | = | 17 | ; WAKEUP - INITIALIZE AND DECIDE WHICH ROUTINE TO INVOKE. | | |
| | | = | 18 | ; | | |
| 000D | 14F9 | = | 19 | WAKEUP: | CALL | INTLZE     ; SET UP ALL PORTS. |
| | | = | 20 | | | |
| 000F | 7443 | = | 21 | WAKLP0: | CALL | KEYCHK     ; IF KEY PRESSED, GO TO ENCODE |
| | | = | 22 | | | |
| 0011 | 744F | = | 23 | | CALL | CK2805     ; TEST FOR CHANNEL ACTIVITY |
| 0013 | B93F | = | 24 | | MOV | R1,#FLAG   ; WAS 2805 DETECTED? |
| 0015 | F1 | = | 25 | | MOV | A,@R1      ; X |
| 0016 | 5320 | = | 26 | | ANL | A,#X2805D  ; X |
| 0018 | C61C | = | 27 | | JZ | $+4        ; NO - MUST HAVE BEEN SOMETHING ELSE |
| 001A | 0420 | = | 28 | | JMP | DECODE     ; YES- GO TRANSLATE INCOMING NO. |
| | | = | 29 | | | |
| 001C | 9AF7 | = | 30 | | ANL | P2,#NOT XKPAWK ; GO BACK TO SLEEP. |
| 001E | 040F | = | 31 | | JMP | WAKLP0     ; IF INSOMNIA, KEEP LOOPING. |
| | | | 32 | | | |
| | | | 33 | $EJECT INCLUDE(:F1:DECODE) | | |
| | | = | 34 | ; | | |
| | | = | 35 | ; DECODE - READ PULSE-ENCODED ID, COMPARE WITH THE PREWIRED ANI, | | |
| | | = | 36 | ;          AND RING SPEAKER IF A 4- OR 7-DIGIT MATCH IS FOUND. | | |
| | | = | 37 | ; | | |
| 0020 | B8FE | = | 38 | DECODE: | MOV | R0,#11111110B ; R0 = 7-DIGIT COMPARE POINTER. |
| 0022 | B9F7 | = | 39 | | MOV | R1,#11110111B ; R1 = 4-DIGIT     "     " . |
| | | = | 40 | | | |
| 0024 | 85 | = | 41 | | CLR | F0         ; F0 = 1 IF 7-DIGIT MISMATCH OCCURS. |
| 0025 | A5 | = | 42 | | CLR | F1         ; F1 = "  "  4-DIGIT    "      " . |
| | | = | 43 | | | |
| 0026 | BA00 | = | 44 | DECLP0: | MOV | R2,#0      ; R2 = PULSE COUNT |
| 0028 | BD56 | = | 45 | DECLP1: | MOV | R5,#86     ; RESET CARRIER TIMEOUT REGISTERS |
| 002A | BE00 | = | 46 | | MOV | R6,#0      ;  FOR 3 SEC. 2805 TIMEOUT |
| 002C | BB0C | = | 47 | DECLP2: | MOV | R3,#12     ; LOOP TIMER - 12=200 MSEC. |
| 002E | BC55 | = | 48 | | MOV | R4,#85     ; 2ND LOOP COUNTER |
| 0030 | 7443 | = | 49 | DECLP3: | CALL | KEYCHK    ; IF KEY PRESSED, GO TO ENCODE |
| 0032 | 8636 | = | 50 | | JNI | $+4        ; WAS A HOOKSWITCH PULSE DETECTED? |
| 0034 | 043A | = | 51 | | JMP | $+6        ; NO - KEEP WAITING |
| 0036 | 230C | = | 52 | | MOV | A,#XPOUND  ; YES- OUTPUT A POSITIVE DISCONNECT |
| 0038 | 2454 | = | 53 | | JMP | ANIOUT     ; X |
| 003A | 4642 | = | 54 | | JNT1 | DECAD0    ; EXIT LOOP IF 2805HZ IS DETECTED. |
| 003C | EC30 | = | 55 | | DJNZ | R4,DECLP3 ; WAIT FOR TONE. |
| 003E | EB30 | = | 56 | | DJNZ | R3,DECLP3 ; WAIT FOR TONE. |
| 0040 | 44D1 | = | 57 | | JMP | SLEEP      ; TIME EXCEEDED - GO BACK TO SLEEP. |
| 0042 | FB | = | 58 | DECAD0: | MOV | A,R3       ; WAS THE LOW PULSE AT LEAST |
| 0043 | 03F4 | = | 59 | | ADD | A,#-12     ;  5 MSEC IN LENGTH? |
| 0045 | E64D | = | 60 | | JNC | DECAD1     ; YES- IT'S LEGITIMATE |
| 0047 | EE2C | = | 61 | | DJNZ | R6,DECLP2 ; NO - DECREMENT TIMEOUT |
| 0049 | ED2C | = | 62 | | DJNZ | R5,DECLP2 ;      AND RESTART |
| 004B | 44D1 | = | 63 | DECAD9: | JMP | SLEEP      ; TIMES UP - GO TO SLEEP |
| 004D | 1A | = | 64 | DECAD1: | INC | R2         ; ADD 1 TO THE PULSE-COUNT. |
| 004E | BB0C | = | 65 | DECLP4: | MOV | R3,#12     ; LOOP TIMER - 12=200 MSEC. |
| 0050 | BC55 | = | 66 | | MOV | R4,#85     ; 2ND LOOP TIMER. |

| LOC | OBJ | LINE | | SOURCE STATEMENT | | |
|---|---|---|---|---|---|---|
| 0052 | 7443 | = 67 | DECLP5: | CALL | KEYCHK | ; IF KEY PRESSED, GO TO ENCODE |
| 0054 | 565C | = 68 | | JT1 | DECAD2 | ; EXIT LOOP IF TONE DROPS OUT. |
| 0056 | EC52 | = 69 | | DJNZ | R4,DECLP5 | ; WAIT FOR NO-TONE. |
| 0058 | EB52 | = 70 | | DJNZ | R3,DECLP5 | ; WAIT FOR NO-TONE. |
| 005A | 0463 | = 71 | | JMP | DECAD3 | ; TIMEOUT - ASSUME INTERDIGIT INTERVAL. |
| 005C | FB | = 72 | DECAD2: | MOV | A,R3 | ; WAS THE HIGH PULSE AT LEAST |
| 005D | 03F4 | = 73 | | ADD | A,#-12 | ;  5 MSEC IN LENGTH? |
| 005F | F64E | = 74 | | JC | DECLP4 | ; NO - IGNORE IT. |
| 0061 | 0428 | = 75 | | JMP | DECLP1 | ; YES- LOOK FOR NEXT PULSE. |
| | | = 76 | | | | |
| 0063 | B676 | = 77 | DECAD3: | JF0 | DECAD5 | ; SKIP 7-DIGIT COMP. IF PRIOR MISMATCH. |
| 0065 | F8 | = 78 | | MOV | A,R0 | ; READ THE NEXT ANI DIGIT. |
| 0066 | 39 | = 79 | | OUTL | P1,A | ; X |
| 0067 | 08 | = 80 | | INS | A,BUS | ; X |
| 0068 | 530F | = 81 | | ANL | A,#0FH | ; KILL THE TOP BITS. |
| 006A | DA | = 82 | | XRL | A,R2 | ; DOES IT MATCH THE DIGIT JUST READ? |
| 006B | C670 | = 83 | | JZ | DECAD4 | ; YES- GO ROTATE MASK. |
| 006D | 95 | = 84 | | CPL | F0 | ; NO - SET FALSE COMPARE FLAG. |
| 006E | 0476 | = 85 | | JMP | DECAD5 | ; GO TRY 4-DIGIT COMP. |
| 0070 | F8 | = 86 | DECAD4: | MOV | A,R0 | ; ROTATE THE STROBE BIT FOR |
| 0071 | E7 | = 87 | | RL | A | ;  THE NEXT COMPARE. |
| 0072 | A8 | = 88 | | MOV | R0,A | ; X |
| 0073 | 37 | = 89 | | CPL | A | ; HAVE ALL DIGITS BEEN COMPARED? |
| 0074 | F288 | = 90 | | JB7 | DECAD8 | ; YES- GO RING BELL. |
| 0076 | 768A | = 91 | DECAD5: | JF1 | DECAD7 | ; SKIP 4-DIGIT COMP. IF PRIOR MISMATCH. |
| 0078 | F9 | = 92 | | MOV | A,R1 | ; READ THE NEXT ANI DIGIT. |
| 0079 | 39 | = 93 | | OUTL | P1,A | ; X |
| 007A | 08 | = 94 | | INS | A,BUS | ; X |
| 007B | 530F | = 95 | | ANL | A,#0FH | ; KILL THE TOP NIBBLE. |
| 007D | DA | = 96 | | XRL | A,R2 | ; DOES IT MATCH THE DIGIT JUST READ? |
| 007E | C683 | = 97 | | JZ | DECAD6 | ; YES- GO ROTATE MASK. |
| 0080 | B5 | = 98 | | CPL | F1 | ; NO - SET FALSE-COMPARE FLAG. |
| 0081 | 048A | = 99 | | JMP | DECAD7 | ; SEE IF BOTH MISMATCH FLAGS ARE SET |
| 0083 | F9 | = 100 | DECAD6: | MOV | A,R1 | ; ROTATE THE STROBE BIT |
| 0084 | E7 | = 101 | | RL | A | ;  FOR THE NEXT COMPARE. |
| 0085 | A9 | = 102 | | MOV | R1,A | ; X |
| 0086 | F226 | = 103 | | JB7 | DECLP0 | ; LOOP TO CHECK NEXT DIGIT |
| 0088 | 048E | = 104 | DECAD8: | JMP | RINGER | ; RING THE SPEAKER |
| | | = 105 | | | | |
| 008A | B64B | = 106 | DECAD7: | JF0 | DECAD9 | ; IF MISMATCH ON BOTH, GO TO SLEEP |
| 008C | 0426 | = 107 | | JMP | DECLP0 | ; TRY NEXT DIGIT |
| | | = 108 | | | | |
| | | 109 | $EJECT INCLUDE(:F1:RINGER) | | | |
| | | = 110 | ; | | | |
| | | = 111 | ; RINGER - PLAYS A TUNE ON THE RADIO'S SPEAKER. | | | |
| | | = 112 | ; | | | |
| 008E | 8A10 | = 113 | RINGER: | ORL | P2,#XHORN | ; BREAK SQUELCH AND SOUND THE HORN |
| 0090 | 237F | = 114 | | MOV | A,#XRNGSL | ; STROBE THE RING SELECT |
| 0092 | 39 | = 115 | | OUTL | P1,A | ; X |
| 0093 | 08 | = 116 | | INS | A,BUS | ; READ THE SONG NUMBER |
| 0094 | 530F | = 117 | | ANL | A,#0FH | ; X |
| 0096 | 03F6 | = 118 | | ADD | A,#-10 | ; IS THE JUMPER SET FOR 0 OR NULL? |
| 0098 | E69C | = 119 | | JNC | $+4 | ; NO - IT'S A VALID SONG |
| 009A | 44D7 | = 120 | | JMP | WARBLE | ; YES- IT'S A SPECIAL RING |
| 009C | 0392 | = 121 | | ADD | A,#LOW SCRTBL+9 | ; INDEX INTO THE SCORE TABLE |
| 009E | E3 | = 122 | | MOVP3 | A,@A | ; FETCH THE SCORE'S STARTING ADDRESS |
| 009F | A8 | = 123 | | MOV | R0,A | ;  AND SAVE IT FOR SUBSEQUENT LOOKUPS |
| | | = 124 | | | | |
| 00A0 | F8 | = 125 | RINLP0: | MOV | A,R0 | ; FETCH THE NEXT NOTE. |
| 00A1 | E3 | = 126 | | MOVP3 | A,@A | ; X |
| 00A2 | C6D7 | = 127 | | JZ | RINAD2 | ; ALL DONE - EXIT. |
| 00A4 | 47 | = 128 | | SWAP | A | ; MASK OFF THE REPEAT COUNT. |
| 00A5 | 530F | = 129 | | ANL | A,#0FH | ; X |
| 00A7 | A9 | = 130 | | MOV | R1,A | ; SAVE #-OF-REPEATS IN R1. |
| 00A8 | BDE3 | = 131 | | MOV | R5,#-29 | ; TIMING ADJUST. |
| | | = 132 | | | | |

```
LOC   OBJ       LINE         SOURCE STATEMENT
00AA  FB      = 133 RINLP1:  MOV    A,R0              ; FETCH THE NOTE.
00AB  E3      = 134          MOVP3  A,@A              ;   X
00AC  530F    = 135          ANL    A,#0FH            ; MASK OFF THE PITCH POINTER.
00AE  96B6    = 136          JNZ    RINAD0            ; IF POINTER > 0, IT'S A VALID NOTE.
00B0  233E    = 137          MOV    A,#62             ; PAUSE FOR 1/16 SEC.
00B2  54C8    = 138          CALL   DELAY             ;   X
00B4  04D0    = 139          JMP    RINAD1            ; JUMP TO DECREMENT REPEAT COUNT.
              = 140
00B6  AA      = 141 RINAD0:  MOV    R2,A              ; SAVE THE POINTER.
00B7  03EB    = 142          ADD    A,#LOW CYCTBL-1   ; INDEX THE CYCLE-COUNT TABLE.
00B9  A3      = 143          MOVP   A,@A              ; SAVE THE NO-OF-CYCLES IN R3.
00BA  AB      = 144          MOV    R3,A              ;   X
              = 145
00BB  FA      = 146 RINLP2:  MOV    A,R2              ; INDEX INTO THE PITCH TABLE.
00BC  03DE    = 147          ADD    A,#LOW PCHTBL-1   ;   X
00BE  A3      = 148          MOVP   A,@A              ;   X
00BF  6D      = 149          ADD    A,R5              ; TIMING ADJUSTMENT.
00C0  97      = 150          CLR    C                 ; DIVIDE PITCH (DELAY) BY 2.
00C1  67      = 151          RRC    A                 ;   X
00C2  AC      = 152          MOV    R4,A              ; SAVE THE HALF-CYCLE DELAY.
00C3  E6C6    = 153          JNC    $+3               ; IT WASN'T ODD - SKIP THE NO-OP.
00C5  00      = 154          NOP                      ; TIMING ADJUST.
00C6  ECC6    = 155          DJNZ   R4,$              ; WAIT FOR NEXT HALF-CYCLE.
00C8  0A      = 156          IN     A,P2              ; FETCH THE CURRENT OUTPUT BIT.
00C9  D340    = 157          XRL    A,#XAUDRX         ; COMPLEMENT THE RECEIVER-AUDIO
00CB  3A      = 158          OUTL   P2,A              ;   LINE AND OUTPUT THE NEW P2 DATA.
00CC  BD00    = 159          MOV    R5,#0             ; CLEAR THE TIMING ADJUSTMENT.
00CE  EBBB    = 160          DJNZ   R3,RINLP2         ; LOOP FOR THE NEXT HALF-CYCLE.
              = 161
00D0  BDF1    = 162 RINAD1:  MOV    R5,#-15           ; TIMING ADJUST.
00D2  E9AA    = 163          DJNZ   R1,RINLP1         ; LOOP UNTIL REPEAT-COUNT = 0
              = 164
00D4  18      = 165          INC    R0                ; INCREMENT THE SCORE POINTER.
00D5  04A0    = 166          JMP    RINLP0            ; LOOP TO OUTPUT THE NEXT NOTE.
              = 167
00D7  36DD    = 168 RINAD2:  JT0    RINAD3            ; WAS SQUELCH CLEAR SELECTED?
00D9  76DD    = 169          JF1    RINAD3            ; YES- WAS IT A SHORT DIAL (4 DIGITS)?
00DB  24A6    = 170          JMP    ANIAD0            ;     YES- EXECUTE CALL-LIGHT RESET
00DD  44D1    = 171 RINAD3:  JMP    SLEEP             ; GO BACK TO SLEEP
              = 172
00DF  FA      = 173 PCHTBL:  DB     271-21
00E0  EB      = 174          DB     256-21
00E1  DD      = 175          DB     242-21
00E2  CF      = 176          DB     228-21
00E3  C2      = 177          DB     215-21
00E4  B6      = 178          DB     203-21
00E5  AB      = 179          DB     192-21
00E6  A0      = 180          DB     181-21
00E7  96      = 181          DB     171-21
00E8  8C      = 182          DB     161-21
00E9  83      = 183          DB     152-21
00EA  7B      = 184          DB     144-21
00EB  73      = 185          DB     136-21
              = 186
00EC  37      = 187 CYCTBL:  DB     55
00ED  3A      = 188          DB     58
00EE  3D      = 189          DB     61
00EF  41      = 190          DB     65
00F0  45      = 191          DB     69
00F1  49      = 192          DB     73
00F2  4E      = 193          DB     78
00F3  52      = 194          DB     82
00F4  57      = 195          DB     87
00F5  5C      = 196          DB     92
00F6  62      = 197          DB     98
00F7  68      = 198          DB     104
00F8  6E      = 199          DB     110
                200
```

| LOC OBJ | LINE | SOURCE STATEMENT | | | |
|---|---|---|---|---|---|
| | 201 | $EJECT INCLUDE(:F1:INTLZE) | | | |
| | = 202 | ; | | | |
| | = 203 | ; INTLZE - INITIALIZE THE OUTPUT PORTS. | | | |
| | = 204 | ; | | | |
| 00F9 65 | = 205 | INTLZE: | STOP | TCNT | ; DISABLE THE TIMEOUT CLOCK |
| | = 206 | | | | |
| 00FA 80 | = 207 | | MOVX | A,@R0 | ; BUS IS AN INPUT PORT. |
| | = 208 | | | | |
| 00FB 23FF | = 209 | | MOV | A,#0FFH | ; PORT 1 = ONES. |
| 00FD 39 | = 210 | | OUTL | P1,A | ; X |
| | = 211 | | | | |
| 00FE 230E | = 212 | | MOV | A,#0FH AND NOT XCLRST; PORT 2 = KEEP AWAKE |
| 0100 3A | = 213 | | OUTL | P2,A | ; X |
| | = 214 | | | | |
| 0101 B93F | = 215 | | MOV | R1,#FLAG | ; RESET ALL FLAGS |
| 0103 B110 | = 216 | | MOV | @R1,#X1STKY | ; X |
| | = 217 | | | | |
| 0105 83 | = 218 | | RET | | ; RETURN TO THE CALLING ROUTINE. |
| | 219 | | | | |
| | 220 | $EJECT INCLUDE(:F1:ENCODE) | | | |
| | = 221 | ; | | | |
| | = 222 | ; ENCODE - HANDLES ALL ENCODING PROTOCOLS. | | | |
| | = 223 | ; | | | |
| 0106 7414 | = 224 | ENCODE: | CALL | RDPHNO | ; FETCH THE PHONE NO. |
| | = 225 | | | | |
| 0108 D30B | = 226 | | XRL | A,#XSTAR | ; IS AN ANI BEING REQUESTED? |
| 010A 9615 | = 227 | | JNZ | ENCAD0 | ; NO - GO TRANSMIT THE PHONE NO. |
| | = 228 | | | | |
| 010C 34F1 | = 229 | ENCLP0: | CALL | KBDINP | ; FETCH THE ANI ROUTING DIGIT. |
| 010E D30B | = 230 | | XRL | A,#XSTAR | ; IS THE DIGIT A '*'? |
| 0110 C60C | = 231 | | JZ | ENCLP0 | ; YES- IGNORE IT. |
| 0112 FE | = 232 | | MOV | A,R6 | ; NO - REFETCH THE DIGIT. |
| 0113 2454 | = 233 | | JMP | ANIOUT | ; TRANSMIT THE ANI. |
| | = 234 | | | | |
| 0115 35 | = 235 | ENCAD0: | DIS | TCNTI | ; DISABLE THE TIMEOUT INTERRUPT. |
| | = 236 | | | | |
| 0116 B820 | = 237 | | MOV | R0,#NUMBUF | ; ADDRESS THE PHONE NUMBER BUFFER. |
| 0118 F0 | = 238 | | MOV | A,@R0 | ; FETCH THE END-OF-BUFFER ADDRESS. |
| 0119 03E0 | = 239 | | ADD | A,#(-NUMBUF) | ; CALCULATE THE NO. OF DIGITS. |
| 011B C628 | = 240 | | JZ | ENCAD1 | ; NO NUMBER - GO TO SLEEP. |
| 011D AA | = 241 | | MOV | R2,A | ; SAVE THE DIGIT COUNT. |
| 011E 27 | = 242 | | CLR | A | ; CLEAR FOR THE NEXT LOOP |
| | = 243 | | | | |
| 011F 18 | = 244 | ENCLP1: | INC | R0 | ; BUMP TO THE NEXT DIGIT. |
| 0120 60 | = 245 | | ADD | A,@R0 | ; ADD IT TO THE CHECKSUM. |
| 0121 EA1F | = 246 | | DJNZ | R2,ENCLP1 | ; LOOP FOR THE NEXT DIGIT. |
| | = 247 | | | | |
| 0123 B83E | = 248 | | MOV | R0,#CHKSUM | ; ADDRESS THE CHECKSUM. |
| 0125 D0 | = 249 | | XRL | A,@R0 | ; DOES THE OLD CHECKSUM MATCH THE NEW? |
| 0126 C62A | = 250 | | JZ | ENCAD2 | ; YES- THE NUMBER IS OK. |
| 0128 44D1 | = 251 | ENCAD1: | JMP | SLEEP | ; NO - DON'T TRANSMIT ANYTHING. |
| | = 252 | | | | |
| 012A 08 | = 253 | ENCAD2: | INS | A,BUS | ; READ THE TOUCH-TONE JUMPER |
| 012B F22F | = 254 | | JB7 | $+4 | ; IS TOUCH-TONE SELECTED? |
| 012D 4472 | = 255 | | JMP | PLSOUT | ; NO - OUTPUT PULSED 2805. |
| 012F 2431 | = 256 | | JMP | TTOUT | ; YES- OUTPUT TOUCH-TONE |
| | 257 | | | | |
| | 258 | $EJECT INCLUDE(:F1:TTOUT) | | | |
| | = 259 | ; | | | |
| | = 260 | ; TTOUT - TOUCH-TONE OUTPUT ROUTINE. | | | |
| | = 261 | ; | | | |
| 0131 8A20 | = 262 | TTOUT: | ORL | P2,#XPTT | ; KEY TRANSMITER. |
| 0133 23FA | = 263 | | MOV | A,#250 | ; WAIT FOR THE TRANSMITTER |
| 0135 54C8 | = 264 | | CALL | DELAY | ; TO WARM UP. |
| | = 265 | | | | |
| 0137 B820 | = 266 | | MOV | R0,#NUMBUF | ; FETCH THE PHONE NUMBER |
| 0139 F0 | = 267 | | MOV | A,@R0 | ; END-OF-BUFFER POINTER. |
| 013A A9 | = 268 | | MOV | R1,A | ; X |
| | = 269 | | | | |

| LOC  | OBJ  | LINE  |         | SOURCE STATEMENT |              | |
|------|------|-------|---------|------------------|--------------|---|
| 013B | F8   | = 270 | TTOLPO: | MOV   | A,R0         | ; HAS THE END OF BUFFER |
| 013C | D9   | = 271 |         | XRL   | A,R1         | ;   BEEN REACHED? |
| 013D | C652 | = 272 |         | JZ    | TTOADO       | ; YES- GO FINISH UP. |
| 013F | 18   | = 273 |         | INC   | R0           | ; NO - ADDRESS THE NEXT DIGIT. |
|      |      | = 274 |         |       |              | |
| 0140 | 236E | = 275 |         | MOV   | A,#LOW KEYTBL | ; LOAD THE DIGIT'S |
| 0142 | 60   | = 276 |         | ADD   | A,@R0        | ;   COLUMN AND ROW |
| 0143 | E3   | = 277 |         | MOVP3 | A,@A         | ;   PATTERN. |
| 0144 | 02   | = 278 |         | OUTL  | BUS,A        | ; SEND THE PATTERN TO THE ENCODER. |
| 0145 | 234B | = 279 |         | MOV   | A,#75        | ; WAIT 75 MSEC. |
| 0147 | 54C8 | = 280 |         | CALL  | DELAY        | ; X |
| 0149 | 23FF | = 281 |         | MOV   | A,#0FFH      | ; TURN THE ENCODER OFF. |
| 014B | 02   | = 282 |         | OUTL  | BUS,A        | ; X |
| 014C | 2332 | = 283 |         | MOV   | A,#50        | ; 50 MSEC. INTERDIGIT TIME. |
| 014E | 54C8 | = 284 |         | CALL  | DELAY        | ; X |
|      |      | = 285 |         |       |              | |
| 0150 | 243B | = 286 |         | JMP   | TTOLPO       | ; LOOP TO PROCESS THE NEXT DIGIT. |
|      |      | = 287 |         |       |              | |
| 0152 | 44D1 | = 288 | TTOADO: | JMP   | SLEEP        | ; ALL DONE - GO TO SLEEP. |
|      |      | = 289 |         |       |              | |
|      |      |   290 | $EJECT INCLUDE(:F1:ANIOUT) | | | |
|      |      | = 291 | ;       |       |              | |
|      |      | = 292 | ; ANIOUT - KEYS PTT RELAY AND TRANSMITS ANI (1402.5 HZ PHASE SHIFTED). | | | |
|      |      | = 293 | ;       |       |              | |
| 0154 | A8   | = 294 | ANIOUT: | MOV   | R0,A         | ; SAVE THE ROUTING DIGIT. |
| 0155 | 8A20 | = 295 |         | ORL   | P2,#XPTT     | ; KEY TRANSMITTER. |
| 0157 | 23FA | = 296 |         | MOV   | A,#250       | ; WAIT 250 MSEC. |
| 0159 | 54C8 | = 297 |         | CALL  | DELAY        | ; X |
|      |      | = 298 |         |       |              | |
| 015B | B9AA | = 299 |         | MOV   | R1,#XFRMW0   | ; SEND FRAME WORD 0 |
| 015D | BF11 | = 300 |         | MOV   | R7,#17       | ;   17 TIMES. |
| 015F | BA18 | = 301 | ANILPO: | MOV   | R2,#24       | ; DELAY = 27-6/2. |
| 0161 | 34AE | = 302 |         | CALL  | ANISBO       | ; SEND CHARACTER. |
| 0163 | EF5F | = 303 |         | DJNZ  | R7,ANILPO    | ; LOOP FOR NEXT FWO. |
|      |      | = 304 |         |       |              | |
| 0165 | B9B4 | = 305 |         | MOV   | R1,#XFRMW1   | ; SEND FRAME WORD 1. |
| 0167 | BA17 | = 306 |         | MOV   | R2,#23       | ; DELAY = 27-8/2. |
| 0169 | 34AE | = 307 |         | CALL  | ANISBO       | ; TRANSMIT CHARACTER. |
|      |      | = 308 |         |       |              | |
| 016B | B933 | = 309 |         | MOV   | R1,#XFRMW2   | ; SEND FRAME WORD 2. |
| 016D | BA18 | = 310 |         | MOV   | R2,#24       | ; DELAY = 27-6/2. |
| 016F | 34AE | = 311 |         | CALL  | ANISBO       | ; TRANSMIT CHARACTER. |
|      |      | = 312 |         |       |              | |
| 0171 | BDFE | = 313 |         | MOV   | R5,#11111110B | ; R5 STROBES SUCCESIVE ANI CODES. |
| 0173 | BA11 | = 314 |         | MOV   | R2,#17       | ; DELAY = 27-20/2. |
| 0175 | FD   | = 315 | ANILP1: | MOV   | A,R5         | ; STROBE THE NEXT ANI DIGIT. |
| 0176 | 39   | = 316 |         | OUTL  | P1,A         | ; X |
| 0177 | 08   | = 317 |         | INS   | A,BUS        | ; FETCH THE DIGIT. |
| 0178 | 530F | = 318 |         | ANL   | A,#0FH       | ; DISCARD THE TOP NIBBLE. |
| 017A | 037B | = 319 |         | ADD   | A,#LOW HAMCOD-1 | ; INDEX INTO THE HAMMING CODE TABLE. |
| 017C | E3   | = 320 |         | MOVP3 | A,@A         | ; FETCH THE CODE. |
| 017D | A9   | = 321 |         | MOV   | R1,A         | ; X |
| 017E | 34AE | = 322 |         | CALL  | ANISBO       | ; TRANSMIT CHARACTER. |
| 0180 | 00   | = 323 |         | NOP   |              | ; TIMING ADJUST. |
| 0181 | BA10 | = 324 |         | MOV   | R2,#16       | ; DELAY = 27-22/2. |
| 0183 | FD   | = 325 |         | MOV   | A,R5         | ; ROTATE THE STROBE MASK. |
| 0184 | E7   | = 326 |         | RL    | A            | ; X |
| 0185 | AD   | = 327 |         | MOV   | R5,A         | ; X |
| 0186 | F275 | = 328 |         | JB7   | ANILP1       | ; LOOP TO OUTPUT THE NEXT CODE. |
|      |      | = 329 |         |       |              | |
| 0188 | F8   | = 330 |         | MOV   | A,R0         | ; FETCH THE ROUTING DIGIT. |
| 0189 | 037B | = 331 |         | ADD   | A,#LOW HAMCOD-1 | ; TRANSLATE TO HAMMING CODE. |
| 018B | E3   | = 332 |         | MOVP3 | A,@A         | ; X |
| 018C | A9   | = 333 |         | MOV   | R1,A         | ; X |
| 018D | 2312 | = 334 |         | MOV   | A,#18        | ; DELAY = 27-18/2. |
| 018F | 34AE | = 335 |         | CALL  | ANISBO       | ; TRANSMIT CHARACTER. |
|      |      | = 336 |         |       |              | |

| LOC | OBJ | LINE | | SOURCE STATEMENT | | |
|---|---|---|---|---|---|---|
| 0191 | 9ADF | = 337 | | ANL | P2,#NOT XPTT | ; TURN TRANSMITTER OFF. |
| 0193 | 89FF | = 338 | | ORL | P1,#0FFH | ; SET PORT 1 = FF. |
| 0195 | F8 | = 339 | | MOV | A,R0 | ; FETCH THE ROUTING CODE |
| 0196 | 03FB | = 340 | | ADD | A,#-5 | ; WAS THE CODE 1 THROUGH 4? |
| 0198 | E6A6 | = 341 | | JNC | ANIAD0 | ; YES- RELEASE THE CALL LIGHT |
| 019A | 03F9 | = 342 | | ADD | A,#5-XPOUND | ; WAS THE CODE POSITIVE DISCONNECT? |
| 019C | C6A6 | = 343 | | JZ | ANIAD0 | ; YES- RELEASE THE CALL LIGHT |
| 019E | B93F | = 344 | | MOV | R1,#FLAG | ; NO - SET PREVIOUS-ANI FLAG |
| 01A0 | F1 | = 345 | | MOV | A,@R1 | ; X |
| 01A1 | 4380 | = 346 | | ORL | A,#XPRANI | ; X |
| 01A3 | A1 | = 347 | | MOV | @R1,A | ; X |
| 01A4 | 2406 | = 348 | | JMP | ENCODE | ; WAIT FOR KEYBOARD INPUT |
| | | = 349 | | | | |
| 01A6 | 8A01 | = 350 | ANIAD0: | ORL | P2,#XCLRST | ; ASSERT CALL-LIGHT RESET |
| 01A8 | 23C8 | = 351 | | MOV | A,#200 | ; WAIT 200 MSEC |
| 01AA | 54C8 | = 352 | | CALL | DELAY | ; X |
| 01AC | 44D1 | = 353 | | JMP | SLEEP | ; GO BACK TO SLEEP |
| | | = 354 | | | | |
| | | = 355 | ; | | | |
| | | = 356 | ; ANISB0 - SUBROUTINE TO TRANSMIT 1 CHARACTER. | | | |
| | | = 357 | ; | | | |
| 01AE | BB08 | = 358 | ANISB0: | MOV | R3,#8 | ; R3 COUNTS THE 8 BITS/CHARACTER. |
| | | = 359 | | | | |
| 01B0 | BC08 | = 360 | ANISOA: | MOV | R4,#8 | ; R4 COUNTS THE 8 HALF-CYCLES/BIT. |
| | | = 361 | | | | |
| 01B2 | EAB2 | = 362 | ANISOB: | DJNZ | R2,$ | ; WAIT FOR NEXT HALF-CYCLE. |
| 01B4 | FC | = 363 | | MOV | A,R4 | ; ROTATE LOW BIT OF CYCLE-COUNT |
| 01B5 | 77 | = 364 | | RR | A | ; INTO BIT 7 OF ACC. |
| 01B6 | D9 | = 365 | | XRL | A,R1 | ; EXCLUSIVE-OR WITH NEXT BIT OF CODE. |
| 01B7 | 5380 | = 366 | | ANL | A,#XAUDTX | ; MASK OFF ALL BUT XMIT BIT. |
| 01B9 | AE | = 367 | | MOV | R6,A | ; SAVE IT. |
| 01BA | 0A | = 368 | | IN | A,P2 | ; READ THE CURRENT OUTPUT BITS. |
| 01BB | 537F | = 369 | | ANL | A,#NOT XAUDTX | ; TURN XMIT BIT OFF. |
| 01BD | 4E | = 370 | | ORL | A,R6 | ; APPEND NEW XMIT BIT. |
| 01BE | 3A | = 371 | | OUTL | P2,A | ; SEND BIT TO P2 BIT 7. |
| 01BF | BA22 | = 372 | | MOV | R2,#34 | ; DELAY. |
| 01C1 | ECB2 | = 373 | | DJNZ | R4,ANISOB | ; LOOP FOR NEXT HALF-CYCLE. |
| | | = 374 | | | | |
| 01C3 | F9 | = 375 | | MOV | A,R1 | ; ROTATE NEXT BIT TO BE |
| 01C4 | E7 | = 376 | | RL | A | ; TRANSMITTED INTO |
| 01C5 | A9 | = 377 | | MOV | R1,A | ; BIT 7 OF R1. |
| 01C6 | 00 | = 378 | | NOP | | ; TIMING ADJUST. |
| 01C7 | BA1D | = 379 | | MOV | R2,#29 | ; DELAY. |
| 01C9 | EBB0 | = 380 | | DJNZ | R3,ANISOA | ; LOOP FOR NEXT BIT |
| | | = 381 | | | | |
| 01CB | 83 | = 382 | | RET | | ; CHARACTER TRANSMIT DONE. |
| | | 383 | | | | |
| | | 384 | $EJECT INCLUDE(:F1:BUSY) | | | |
| | | = 385 | ; | | | |
| | | = 386 | ; BUSY - PRODUCES THE CHANNEL-BUSY TONE | | | |
| | | = 387 | ; | | | |
| 01CC | 8A10 | = 388 | BUSY: | ORL | P2,#XHORN | ; BREAK THE SQUELCH |
| 01CE | 2364 | = 389 | | MOV | A,#100 | ; X |
| 01D0 | 54C8 | = 390 | | CALL | DELAY | ; X |
| 01D2 | 9AEF | = 391 | | ANL | P2,#NOT XHORN | ; X |
| 01D4 | B803 | = 392 | | MOV | R0,#3 | ; SEND 3 TONE BURSTS |
| 01D6 | B928 | = 393 | BUSLP0: | MOV | R1,#40 | ; SEND 40 TONE PAIRS PER BURST |
| 01D8 | BA02 | = 394 | BUSLP1: | MOV | R2,#2 | ; SEND ONE CYCLE OF 480 HZ. |
| 01DA | BBF4 | = 395 | | MOV | R3,#244 | ; X |
| 01DC | 7409 | = 396 | | CALL | WARSB0 | ; X |
| 01DE | BA02 | = 397 | | MOV | R2,#2 | ; SEND ONE CYCLE OF 620 HZ. |
| 01E0 | BBBB | = 398 | | MOV | R3,#187 | ; X |
| 01E2 | 7409 | = 399 | | CALL | WARSB0 | ; X |
| 01E4 | E9D8 | = 400 | | DJNZ | R1,BUSLP1 | ; LOOP FOR NEXT PAIR OF TONES |
| 01E6 | 23FA | = 401 | | MOV | A,#250 | ; WAIT 250 MSEC. |
| 01E8 | 54C8 | = 402 | | CALL | DELAY | ; X |

```
LOC   OBJ         LINE            SOURCE STATEMENT

01EA  E8D6      = 403             DJNZ    R0,BUSLP0       ; LOOP FOR NEXT TONE BURST
01EC  24A6      = 404             JMP     ANIAD0          ; TURN OFF THE CALL LIGHT
                  405
01F1              406             ORG     $+3
                  407 $EJECT INCLUDE(:F1:KBDINP)
                = 408 ;
                = 409 ; KBDINP - KEYBOARD INPUT ROUTINE.
                = 410 ;
01F1  BFCB      = 411 KBDINP:     MOV     R7,#KTMLIM      ; INITIALIZE THE WATCHDOG.
01F3  55        = 412             STRT    T               ; X
01F4  25        = 413             EN      TCNTI           ; X
                = 414
01F5  5457      = 415             CALL    KBDSB0          ; READ THE KEYBOARD.
01F7  C6F5      = 416             JZ      $-2             ; NO KEY PRESSED - TRY AGAIN.
                = 417
01F9  AE        = 418             MOV     R6,A            ; SAVE THE KEY
01FA  B93F      = 419             MOV     R1,#FLAG        ; HAS ANI BEEN TRANSMITTED PREVIOUSLY?
01FC  F1        = 420             MOV     A,@R1           ; X
01FD  5380      = 421             ANL     A,#XPRANI       ; X
01FF  9634      = 422             JNZ     KBDAD3          ; YES- GO SEND AUDIBLE TONE
0201  F1        = 423             MOV     A,@R1           ; NO - HAS THE 2805 CHECK BEEN PERFORMED?
0202  5340      = 424             ANL     A,#X2805T       ; X
0204  9608      = 425             JNZ     $+4             ; YES- DON'T CHECK IT AGAIN
0206  744F      = 426             CALL    CK2805          ; NO - SEE IF THE CHANNEL IS BUSY
0208  F1        = 427             MOV     A,@R1           ; IS THE CHANNEL BUSY?
0209  5320      = 428             ANL     A,#X2805D       ; X
020B  C623      = 429             JZ      KBDAD2          ; NO - TEST FOR FIRST-KEY
020D  FE        = 430             MOV     A,R6            ; YES- IS THE KEY A '*'?
020E  D30B      = 431             XRL     A,#XSTAR        ; X
0210  9618      = 432             JNZ     KBDAD0          ; NO - SEE IF IT'S A '#'
0212  F1        = 433             MOV     A,@R1           ; YES- SET THE PREVIOUS-* FLAG
0213  4308      = 434             ORL     A,#XPRVST       ; X
0215  A1        = 435             MOV     @R1,A           ; X
0216  4434      = 436             JMP     KBDAD3          ; GO SEND AUDIBLE TONE
0218  D307      = 437 KBDAD0:     XRL     A,#XPOUND XOR XSTAR; IS THE KEY A '#'>
021A  9621      = 438             JNZ     KBDAD1          ; NO - SEND THE BUSY TONE
021C  F1        = 439             MOV     A,@R1           ; YES- WAS A '*' PREVIOUSLY ENTERED?
021D  5308      = 440             ANL     A,#XPRVST       ; X
021F  9634      = 441             JNZ     KBDAD3          ; YES- GO SEND AUDIBLE TONE
0221  24CC      = 442 KBDAD1:     JMP     BUSY            ; NO - EXIT TO BUSY-TONE ROUTINE
0223  F1        = 443 KBDAD2:     MOV     A,@R1           ; IS THIS THE FIRST KEY ENTERED?
0224  5310      = 444             ANL     A,#X1STKY       ; X
0226  C634      = 445             JZ      KBDAD3          ; NO - GO SEND AUDIBLE TONE
0228  F1        = 446             MOV     A,@R1           ; YES- CLEAR THE FIRST-KEY FLAG
0229  53EF      = 447             ANL     A,#NOT X1STKY   ; X
022B  A1        = 448             MOV     @R1,A           ; X
022C  8A10      = 449             ORL     P2,#XHORN       ; BREAK THE SQUELCH
022E  2364      = 450             MOV     A,#100          ; X
0230  54C8      = 451             CALL    DELAY           ; X
0232  9AEF      = 452             ANL     P2,#NOT XHORN   ; X
0234  BAF0      = 453 KBDAD3:     MOV     R2,#240         ; OUTPUT THE KEY ACKNOWLEDGE TONE
0236  BB2D      = 454 KBDLP1:     MOV     R3,#45          ; X
0238  EB3B      = 455             DJNZ    R3,$            ; X
023A  0A        = 456             IN      A,P2            ; X
023B  D340      = 457             XRL     A,#XAUDRX       ; X
023D  3A        = 458             OUTL    P2,A            ; X
023E  EA36      = 459             DJNZ    R2,KBDLP1       ; X
0240  FE        = 460             MOV     A,R6            ; RESTORE THE KEY VALUE
0241  85        = 461             CLR     F0              ; SET THE CLEAR-KEY FLAG.
0242  95        = 462             CPL     F0              ; X
                = 463
0243  BFCB      = 464 KBDLP0:     MOV     R7,#KTMLIM      ; RESET THE KEY-PRESSED TIMEOUT.
0245  AE        = 465             MOV     R6,A            ; SAVE THE KEY.
0246  D30D      = 466             XRL     A,#XCLEAR       ; IS IT THE 'CLEAR' KEY?
0248  964B      = 467             JNZ     $+3             ; NO - GO READ THE NEXT KEY.
024A  85        = 468             CLR     F0              ; CLEAR THE CLEAR-BUFFER FLAG.
024B  5457      = 469             CALL    KBDSB0          ; READ THE KEYBOARD.
```

| LOC  | OBJ  | LINE  |        | SOURCE STATEMENT |                                  |
|------|------|-------|--------|------------------|----------------------------------|
| 024D | 9643 | = 470 | JNZ    | KBDLP0           | ; KEY PRESSED - LOOP.            |
|      |      | = 471 |        |                  |                                  |
| 024F | 65   | = 472 | STOP   | TCNT             | ; DISABLE THE WATCHDOG TIMER.    |
| 0250 | FE   | = 473 | MOV    | A,R6             | ; RESTORE THE LAST KEY PRESSED.  |
| 0251 | B656 | = 474 | JF0    | KBDAD4           | ; WAS THE 'CLEAR' KEY DETECTED?  |
| 0253 | 230D | = 475 | MOV    | A,#XCLEAR        | ; YES- PASS BACK IT'S VALUE.     |
| 0255 | AE   | = 476 | MOV    | R6,A             | ; X                              |
|      |      | = 477 |        |                  |                                  |
| 0256 | 93   | = 478 | KBDAD4: RETR |            | ; RETURN TO THE CALLING ROUTINE. |
|      |      | = 479 |        |                  |                                  |
| 0257 | BD00 | = 480 | KBDSB0: MOV | R5,#0        | ; CLEAR THE DEBOUNCE COUNTER.    |
| 0259 | 08   | = 481 | KBDS0A: INS | A,BUS        | ; READ THE KEYBOARD.             |
| 025A | 4380 | = 482 | ORL    | A,#80H           | ; MASK OFF THE TOUCH-TONE JUMPER |
| 025C | 2C   | = 483 | XCH    | A,R4             | ; SAVE THE NEW PATTERN.          |
| 025D | DC   | = 484 | XRL    | A,R4             | ; IS IT THE SAME AS THE OLD ONE? |
| 025E | 9657 | = 485 | JNZ    | KBDSB0           | ; NO - RESET DEBOUNCE COUNTER.   |
| 0260 | ED59 | = 486 | DJNZ   | R5,KBDS0A        | ; YES- WAIT TILL WE'RE SURE IT'S OK. |
|      |      | = 487 |        |                  |                                  |
| 0262 | BD0E | = 488 | MOV    | R5,#KEYTBX-KEYTBL | ; LOAD THE NO. OF ENTRIES.      |
| 0264 | 236D | = 489 | KBDS0B: MOV | A,#LOW KEYTBL-1 | ; FETCH THE NEXT PATTERN.    |
| 0266 | 6D   | = 490 | ADD    | A,R5             | ; X                              |
| 0267 | E3   | = 491 | MOVP3  | A,@A             | ; X                              |
| 0268 | DC   | = 492 | XRL    | A,R4             | ; DO THE PATTERNS MATCH?         |
| 0269 | C66F | = 493 | JZ     | KBDS0C           | ; YES- RETURN THE KEY'S VALUE.   |
| 026B | ED64 | = 494 | DJNZ   | R5,KBDS0B        | ; NO - KEEP LOOKING.             |
|      |      | = 495 |        |                  |                                  |
| 026D | 4457 | = 496 | JMP    | KBDSB0           | ; NOT A VALID KEY - TRY AGAIN.   |
|      |      | = 497 |        |                  |                                  |
| 026F | FD   | = 498 | KBDS0C: MOV | A,R5         | ; FETCH THE TABLE POINTER.       |
| 0270 | 07   | = 499 | DEC    | A                | ; ADJUST THE VALUE.              |
| 0271 | 83   | = 500 | RET    |                  | ; RETURN TO CALLING ROUTINE.     |
|      |      | 501   |        |                  |                                  |
|      |      | 502   | $EJECT INCLUDE(:F1:PLSOUT) |  |                                  |
|      |      | = 503 | ;      |                  |                                  |
|      |      | = 504 | ; PLSOUT - KEYS PTT RELAY AND TRANSMITS NUMBER (2805 HZ PULSED). |    |    |
|      |      | = 505 | ;      |                  |                                  |
| 0272 | 8A20 | = 506 | PLSOUT: ORL | P2,#XPTT     | ; KEY THE TRANSMITTER.           |
| 0274 | 23FA | = 507 | MOV    | A,#250           | ; WAIT 250 MSEC.                 |
| 0276 | 54C8 | = 508 | CALL   | DELAY            | ; X                              |
|      |      | = 509 |        |                  |                                  |
| 0278 | B820 | = 510 | MOV    | R0,#NUMBUF       | ; R0 INDEXES THE NUMBER'S DIGITS. |
| 027A | F0   | = 511 | MOV    | A,@R0            | ; FETCH THE ADDRESS OF THE LAST  |
| 027B | AB   | = 512 | MOV    | R3,A             | ;   DIGIT AND SAVE IT IN R3.     |
| 027C | F8   | = 513 | PLSLP0: MOV | A,R0         | ; COMPARE THE DIGIT POINTER      |
| 027D | DB   | = 514 | XRL    | A,R3             | ;   TO IT'S LIMIT IN R3.         |
| 027E | C6AE | = 515 | JZ     | PLSAD0           | ; END-OF-BUFFER, EXIT.           |
| 0280 | 18   | = 516 | INC    | R0               | ; POINT TO NEXT DIGIT.           |
| 0281 | F0   | = 517 | MOV    | A,@R0            | ; MOVE THE PULSE COUNT           |
| 0282 | AC   | = 518 | MOV    | R4,A             | ;   INTO R4.                     |
| 0283 | B980 | = 519 | MOV    | R1,#XAUDTX       | ; TONE ENABLED.                  |
| 0285 | BD50 | = 520 | MOV    | R5,#80           | ; INTERDIGIT TIME = 800 MSEC.    |
| 0287 | 0A   | = 521 | IN     | A,P2             | ; IS HIGH-SPEED DIALING JUMPERED? |
| 0288 | 328C | = 522 | JB1    | $+4              | ; NO - TIME IS OK.               |
| 028A | BD28 | = 523 | MOV    | R5,#40           | ; YES- INTERDIGIT TIME = 400 MSEC. |
| 028C | BA01 | = 524 | MOV    | R2,#1            | ; DELAY.                         |
| 028E | 54B4 | = 525 | CALL   | PLSSB0           | ; TRANSMIT INTERDIGIT TONE.      |
| 0290 | B900 | = 526 | PLSLP1: MOV | R1,#0        | ; TONE DISABLED.                 |
| 0292 | BD06 | = 527 | MOV    | R5,#6            | ; TONEOFF TIME = 60 MSEC.        |
| 0294 | 0A   | = 528 | IN     | A,P2             | ; IS HIGH-SPEED DIALING JUMPERED? |
| 0295 | 3299 | = 529 | JB1    | $+4              | ; NO - TIME IS OK.               |
| 0297 | BD03 | = 530 | MOV    | R5,#3            | ; YES- TONEOFF TIME = 30 MSEC.   |
| 0299 | BA02 | = 531 | MOV    | R2,#2            | ; DELAY.                         |
| 029B | 54B4 | = 532 | CALL   | PLSSB0           | ; TRANSMIT CARRIER.              |
| 029D | B980 | = 533 | MOV    | R1,#XAUDTX       | ; TONE ENABLED.                  |
| 029F | BD04 | = 534 | MOV    | R5,#4            | ; TONEON TIME = 40 MSEC.         |
| 02A1 | 0A   | = 535 | IN     | A,P2             | ; IS HIGH-SPEED DIALING JUMPERED? |
| 02A2 | 32A6 | = 536 | JB1    | $+4              | ; NO - TIME IS OK.               |
| 02A4 | BD02 | = 537 | MOV    | R5,#2            | ; YES- TONEON TIME = 20 MSEC.    |

```
LOC   OBJ       LINE          SOURCE STATEMENT

02A6 BA02      = 538          MOV    R2,#2          ; DELAY.
02A8 54B4      = 539          CALL   PLSSB0         ; TRANSMIT TONE.
02AA EC90      = 540          DJNZ   R4,PLSLP1      ; LOOP TO OUTPUT THE NEXT PULSE.
               = 541
02AC 447C      = 542          JMP    PLSLP0         ; LOOP TO OUTPUT THE NEXT DIGIT.
               = 543
02AE BA02      = 544 PLSAD0:  MOV    R2,#2          ; DELAY.
02B0 54B4      = 545          CALL   PLSSB0         ; TRANSMIT FINAL TONE (2.56 SEC.).
               = 546
02B2 44D1      = 547          JMP    SLEEP          ; ALL DONE - GO TO SLEEP.
               = 548
               = 549 ;
               = 550 ; PLSSB0 - TRANSMIT EITHER CARRIER OR TONE FOR 10*(R5) MSEC.
               = 551 ;
02B4 BE38      = 552 PLSSB0:  MOV    R6,#56         ; 56 HALF-CYCLES = 10 MSEC.
               = 553 PLSS0A:
02B6 EAB6      = 554          DJNZ   R2,$           ; WAIT FOR NEXT HALF-CYCLE.
02B8 0A        = 555          IN     A,P2           ; FETCH THE CURRENT OUTPUT BIT.
02B9 D9        = 556          XRL    A,R1           ; IF R1>0, THE BIT WILL BE TOGGLED.
02BA 3A        = 557          OUTL   P2,A           ; OUTPUT THE NEW BIT.
02BB 95        = 558          CPL    F0             ; SKIP 1 INSTRUCTION EVERY
02BC B6BF      = 559          JF0    $+3            ;   2ND PASS SINCE AVERAGE
02BE 00        = 560          NOP                   ;   TIME = 45.5 INSTRUCTIONS.
02BF BA0F      = 561          MOV    R2,#15         ; DELAY.
02C1 EEB6      = 562          DJNZ   R6,PLSS0A      ; LOOP FOR NEXT HALF-CYCLE.
               = 563
02C3 BA0C      = 564          MOV    R2,#12         ; DELAY
02C5 EDB4      = 565          DJNZ   R5,PLSSB0      ; LOOP FOR NEXT 10 MSEC. PERIOD.
               = 566
02C7 83        = 567          RET                   ; ALL DONE - EXIT.
                 568
                 569 $EJECT INCLUDE(:F1:DELAY)

= 570 ;
               = 571 ; DELAY ROUTINE- WAITS (ACC) MSEC., THEN RETURNS.
               = 572 ;
02C8 D5        = 573 DELAY:   SEL    RB1
02C9 BF77      = 574 DELLP0:  MOV    R7,#119        ; (ASSUMES A 3.58 MHZ XTAL)
02CB EFCB      = 575          DJNZ   R7,$           ; THUMB-TWIDDLING TIME.
02CD 07        = 576          DEC    A              ; COUNT MSEC.
02CE 96C9      = 577          JNZ    DELLP0         ; LOOP UNTIL FINISHED.
02D0 93        = 578          RETR
                 579
                 580 $EJECT INCLUDE(:F1:SLEEP)

= 581 ;
               = 582 ; SLEEP - TURN THE 8048 OFF.
               = 583 ;
02D1 14F9      = 584 SLEEP:   CALL   INTLZE         ; RESET ALL PORTS.
02D3 9AF7      = 585          ANL    P2,#NOT XKPAWK ; TURN OFF KEEP-AWAKE BIT.
02D5 0400      = 586          JMP    000H           ; START OVER AGAIN.
                 587
                 588 $EJECT INCLUDE(:F1:WARBLE)
               = 589 ;
               = 590 ; WARBLE - OUTPUT THE SPECIAL RING TONES
               = 591 ;
02D7 96E9      = 592 WARBLE:  JNZ    WARAD0         ; RING 2 REQUESTED
02D9 B914      = 593          MOV    R1,#20         ; BEEP 20 TIMES (2 SEC.)
02DB BA78      = 594 WARLP0:  MOV    R2,#120        ; DO 120 HALF-CYCLES (50 MSEC.)
02DD BB2C      = 595          MOV    R3,#44         ; DELAY FOR 2400 HZ.
02DF 7409      = 596          CALL   WARSB0         ; OUTPUT THE TONE
02E1 2332      = 597          MOV    A,#50          ; WAIT 50 MSEC
02E3 54C8      = 598          CALL   DELAY          ;  X
02E5 E9DB      = 599          DJNZ   R1,WARLP0      ; LOOP FOR NEXT TONE
02E7 04D7      = 600          JMP    RINAD2         ; PERFORM CALL-LIGHT RESET CHECK
               = 601
```

```
LOC   OBJ         LINE        SOURCE STATEMENT

02E9  B803     =  602  WARAD0: MOV     R0,#3           ; 3 CYCLES OF TONE
02EB  B906     =  603  WARLP1: MOV     R1,#6           ; 6 SETS OF 2 TONES
02ED  BA3C     =  604  WARLP2: MOV     R2,#60          ; NO. OF CYCLES OF TONE 1
02EF  BB2C     =  605          MOV     R3,#44          ; DELAY FOR TONE 1
02F1  7409     =  606          CALL    WARSB0          ; OUTPUT THE TONE
02F3  BA48     =  607          MOV     R2,#72          ; NO. OF CYCLES FOR TONE 2
02F5  BB24     =  608          MOV     R3,#36          ; DELAY FOR TONE 2
02F7  7409     =  609          CALL    WARSB0          ; OUTPUT TONE 2
02F9  E9ED     =  610          DJNZ    R1,WARLP2       ; OUTPUT THE NEXT TONE PAIR
02FB  E8FF     =  611          DJNZ    R0,$+4          ; KEEP GOING IF ALL TONES NOT SENT
02FD  04D7     =  612          JMP     RINAD2          ; PERFORM CALL-LIGHT RESET CHECK
02FF  B902     =  613          MOV     R1,#2           ; WAIT 400 MSEC.
0301  23CB     =  614  WARLP3: MOV     A,#200          ; X
0303  54C8     =  615          CALL    DELAY           ; X
0305  E901     =  616          DJNZ    R1,WARLP3       ; X
0307  44EB     =  617          JMP     WARLP1          ; SEND NEXT TONE BURST
               =  618
0309  FB       =  619  WARSB0: MOV     A,R3            ; FETCH THE DELAY
030A  AC       =  620          MOV     R4,A            ; X
030B  ECOB     =  621          DJNZ    R4,$            ; WAIT FOR NEXT HALF-CYCLE
030D  0A       =  622          IN      A,P2            ; TOGGLE THE OUTPUT BIT
030E  D340     =  623          XRL     A,#XAUDRX       ; X
0310  3A       =  624          OUTL    P2,A            ; X
0311  EA09     =  625          DJNZ    R2,WARSB0       ; LOOP FOR THE NEXT HALF-CYCLE
0313  83       =  626          RET                     ; EXIT
                  627
                  628 $EJECT INCLUDE(:F1:RDPHNO)
               =  629 ;
               =  630 ; RDPHNO - READ A PHONE NUMBER INTO MEMORY ALONG WITH IT'S CHECKSUM.
               =  631 ;
0314  34F1     =  632  RDPHNO: CALL    KBDINP          ; READ THE KEYBOARD.
0316  03F5     =  633          ADD     A,#-11          ; IS THE CHARACTER A DIGIT?
0318  F626     =  634          JC      RDPLP1          ; NO - GO DECIDE WHAT IT IS.
               =  635
031A  B820     =  636  RDPLP0: MOV     R0,#NUMBUF      ; RESET THE BUFFER POINTER.
031C  B020     =  637          MOV     @R0,#NUMBUF     ; X
031E  B93E     =  638          MOV     R1,#CHKSUM      ; RESET THE CHECKSUM.
0320  B100     =  639          MOV     @R1,#0          ; X
0322  9626     =  640          JNZ     RDPLP1          ; WAS THE 'CLEAR' KEY PRESSED?
0324  44D1     =  641          JMP     SLEEP           ; YES- GO TO SLEEP.
               =  642
0326  FE       =  643  RDPLP1: MOV     A,R6            ; REFETCH THE DIGIT.
0327  D30B     =  644          XRL     A,#XSTAR        ; WAS IT A '*'?
0329  C641     =  645          JZ      RDPAD0          ; YES- EXIT.
032B  D307     =  646          XRL     A,#XPOUND XOR XSTAR ; WAS IT A '#'?
032D  C641     =  647          JZ      RDPAD0          ; YES- EXIT.
032F  D301     =  648          XRL     A,#XCLEAR XOR XPOUND ; WAS IT A '**'?
0331  C61A     =  649          JZ      RDPLP0          ; YES- CLEAR THE BUFFER.
               =  650
0333  FE       =  651          MOV     A,R6            ; REFETCH THE DIGIT.
0334  18       =  652          INC     R0              ; BUMP TO THE NEXT BUFFER POSITION.
0335  A0       =  653          MOV     @R0,A           ; STORE THE DIGIT.
0336  B93E     =  654          MOV     R1,#CHKSUM      ; ADD IT TO THE CHECKSUM.
0338  61       =  655          ADD     A,@R1           ; X
0339  A1       =  656          MOV     @R1,A           ; X
033A  B920     =  657          MOV     R1,#NUMBUF      ; BUMP THE BUFFER POINTER.
033C  11       =  658          INC     @R1             ; X
               =  659
033D  34F1     =  660          CALL    KBDINP          ; READ THE NEXT KEY.
033F  6426     =  661          JMP     RDPLP1          ; LOOP TO TEST THE DIGIT.
               =  662
0341  FE       =  663  RDPAD0: MOV     A,R6            ; REFETCH THE KEY.
0342  83       =  664          RET                     ; RETURN TO THE CALLING ROUTINE.
                  665
                  666 $EJECT INCLUDE(:F1:KEYCHK)
               =  667 ;
               =  668 ; KEYCHK - IF A KEY IS PRESSED, EXIT TO ENCODE ROUTINE
               =  669 ;
```

```
LOC  OBJ        LINE        SOURCE STATEMENT 0343 89FF     =  670 KEYCHK: ORL    P1,#0FFH          ; CLEAR ANI STROBES
0345 08       =  671         INS    A,BUS             ; READ THE KEYBOARD
0346 4380     =  672         ORL    A,#80H            ; MASK OFF THE TOUCH-TONE JUMPER
0348 D3FF     =  673         XRL    A,#0FFH           ; COMPLEMENT THE ROWS AND COLUMNS
034A C64E     =  674         JZ     KEYAD1            ; NO KEY PRESSED - EXIT
034C 2406     =  675 KEYAD0: JMP    ENCODE            ; JUMP TO READ THE KEYBOARD
              =  676
034E 83       =  677 KEYAD1: RET                      ; EXIT TO THE CALLING ROUTINE
                 678
                 679 $EJECT INCLUDE(:F1:CK2805)

=  680 ;
              =  681 ; CK2805 - CHECK FOR 2805 TONE
              =  682 ;
034F BA03     =  683 CK2805: MOV    R2,#HIGH(1000)    ; CHECK FOR 2/3 PRESENT
0351 BBE8     =  684         MOV    R3,#LOW  1000     ; X
0353 BC05     =  685         MOV    R4,#HIGH 1500     ; APPROX. 50 MSEC.
0355 BDDC     =  686         MOV    R5,#LOW  1500     ; X
0357 565D     =  687 CK2LP0: JT1    CK2AD0            ; NO TONE - SKIP THE DECREMENT
0359 EB5F     =  688         DJNZ   R3,CK2AD1         ; DECREMENT THE COUNTERS
035B EA5F     =  689         DJNZ   R2,CK2AD1         ; X
035D 00       =  690 CK2AD0: NOP                      ; DUMMY DELAY
035E 00       =  691         NOP                      ; X
035F ED57     =  692 CK2AD1: DJNZ   R5,CK2LP0         ; COUNT DOWN
0361 EC57     =  693         DJNZ   R4,CK2LP0         ; X
0363 FA       =  694         MOV    A,R2              ; FETCH THE 2805 COUNTER
0364 37       =  695         CPL    A                 ; HAS IT BEEN DECREMENTED PAST ZERO?
0365 F26D     =  696         JB7    CK2AD2            ; NO - NO 2805 PRESENT
0367 B93F     =  697         MOV    R1,#FLAG          ; YES- SET THE 2805-DETECTED FLAG
0369 F1       =  698         MOV    A,@R1             ; X
036A 4320     =  699         ORL    A,#X2805D         ; X
036C A1       =  700         MOV    @R1,A             ; X
036D 83       =  701 CK2AD2: RET                      ; EXIT
                 702
                 703         IF     $ LT 300H
                 704         ORG    300H
                 705         ENDIF
                 706 $EJECT INCLUDE(:F1:TABLES)
              =  707 ;
              =  708 ; TABLES - PAGE 3 TABLES USED BY RINGER, KBDINP, TTANI AND TTOUT.
              =  709 ;
              =  710
036E FF       =  711 KEYTBL: DB     11111111B
036F EE       =  712         DB     11101110B
0370 DE       =  713         DB     11011110B
0371 BE       =  714         DB     10111110B
0372 ED       =  715         DB     11101101B
0373 DD       =  716         DB     11011101B
0374 BD       =  717         DB     10111101B
0375 EB       =  718         DB     11101011B
0376 DB       =  719         DB     11011011B
0377 BB       =  720         DB     10111011B
0378 D7       =  721         DB     11010111B
0379 E7       =  722         DB     11100111B
037A B7       =  723         DB     10110111B
037B A7       =  724         DB     10100111B
037C          =  725 KEYTBX  EQU    $
              =  726
037C FF       =  727 HAMCOD: DB     0FFH              ; 1.
037D E1       =  728         DB     0E1H              ; 2.
037E 78       =  729         DB     078H              ; 3.
037F 66       =  730         DB     066H              ; 4.
0380 99       =  731         DB     099H              ; 5.
0381 87       =  732         DB     087H              ; 6.
0382 1E       =  733         DB     01EH              ; 7.
0383 00       =  734         DB     000H              ; 8.
0384 D2       =  735         DB     0D2H              ; 9.
```

```
LOC  OBJ        LINE      SOURCE STATEMENT 0385 2D       = 736       DB      02DH            ; 0.
0386 00       = 737       DB      000H            ; *.
0387 B4       = 738       DB      0B4H            ; *.
0388 B4       = 739       DB      0B4H            ; **.
                740
                741 $EJECT INCLUDE(:F1:SCRTBL)
              = 742 ;
              = 743 ; SCRTBL - TABLE OF SONG SCORES FOR THE RINGER ROUTINE
              = 744 ;
0389 92       = 745 SCRTBL: DB    LOW DIXIE
038A A3       = 746       DB      LOW SAAHC
038B B0       = 747       DB      LOW CHIMES
038C BA       = 748       DB      LOW WLTELL
038D CD       = 749       DB      LOW LANDH
038E DF       = 750       DB      LOW AMERCA
038F 92       = 751       DB      LOW DIXIE
0390 92       = 752       DB      LOW DIXIE
0391 92       = 753       DB      LOW DIXIE
              = 754
0392 28       = 755 DIXIE: DB     028H,025H,021H,010H,021H,010H,021H,023H
0393 25       =
0394 21       =
0395 10       =
0396 21       =
0397 10       =
0398 21       =
0399 23       =
039A 25       = 756       DB      025H,026H,028H,010H,028H,010H,048H,045H
039B 26       =
039C 28       =
039D 10       =
039E 28       =
039F 10       =
03A0 48       =
03A1 45       =
03A2 00       = 757       DB      0
03A3 36       = 758 SAAHC: DB     036H,010H,011H,010H,011H,010H,043H,041H
03A4 10       =
03A5 11       =
03A6 10       =
03A7 11       =
03A8 10       =
03A9 43       =
03AA 41       =
03AB 40       = 759       DB      040H,035H,010H,036H
03AC 35       =
03AD 10       =
03AE 36       =
03AF 00       = 760       DB      0
03B0 4A       = 761 CHIMES: DB    04AH,046H,048H,061H,020H,041H,048H,04AH
03B1 46       =
03B2 48       =
03B3 61       =
03B4 20       =
03B5 41       =
03B6 48       =
03B7 4A       =
03B8 86       = 762       DB      086H
03B9 00       = 763       DB      0
03BA 11       = 764 WLTELL: DB    011H,010H,011H,010H,031H,010H,011H,010H
03BB 10       =
03BC 11       =
03BD 10       =
03BE 31       =
03BF 10       =
03C0 11       =
03C1 10       =
```

```
LOC  OBJ        LINE        SOURCE STATEMENT

03C2 11       = 765         DB      011H,010H,031H,010H,011H,010H,021H,046H
03C3 10       =
03C4 31       =
03C5 10       =
03C6 11       =
03C7 10       =
03C8 21       =
03C9 46       =
03CA 48       = 766         DB      048H,04AH
03CB 4A       =
03CC 00       = 767         DB      0
03CD 21       = 768 LANDH:  DB      021H,046H,02AH,046H,021H,046H,02AH,046H
03CE 46       =
03CF 2A       =
03D0 46       =
03D1 21       =
03D2 46       =
03D3 2A       =
03D4 46       =
03D5 21       = 769         DB      021H,046H,028H,02AH,028H,026H,045H,026H
03D6 46       =
03D7 28       =
03D8 2A       =
03D9 28       =
03DA 26       =
03DB 45       =
03DC 26       =
03DD 48       = 770         DB      048H
03DE 00       = 771         DB      0
03DF 36       = 772 AMERCA: DB      036H,010H,046H,048H,065H,026H,048H,03AH
03E0 10       =
03E1 46       =
03E2 48       =
03E3 65       =
03E4 26       =
03E5 48       =
03E6 3A       =
03E7 10       = 773         DB      010H,04AH,04BH,06AH,028H,046H
03E8 4A       =
03E9 4B       =
03EA 6A       =
03EB 28       =
03EC 46       =
03ED 00       = 774         DB      0
                775
                776 $EJECT INCLUDE(:F1:EQUS)
              = 777 ;
              = 778 ; EQUS - SYSTEM RAM ASSIGNMENTS AND MASK EQUATES.
              = 779 ;
0020          = 780         ORG     20H
0020          = 781 NUMBUF: DS      30          ; PHONE NUMBER BUFFER.
003E          = 782 CHKSUM: DS      1           ; PHONE NUMBER CHECKSUM.
003F          = 783 FLAG:   DS      1           ; FLAG REGISTER
              = 784 ;
0080          = 785 XPRANI  EQU    10000000B    ; PREVIOUS-ANI FLAG
0040          = 786 X2805T  EQU    01000000B    ; 2805-TESTED      "
0020          = 787 X2805D  EQU    00100000B    ; 2805-DETECTED    "
0010          = 788 X1STKY  EQU    00010000B    ; FIRST-KEY        "
0008          = 789 XPRVST  EQU    00001000B    ; PREVIOUS-'*'     "
              = 790 ;
007F          = 791 XRNGSL  EQU    01111111B    ; RING SELECT STROBE
              = 792 ;
0080          = 793 XAUDTX  EQU    10000000B    ; TRANSMIT-MODE AUDIO OUTPUT.
0040          = 794 XAUDRX  EQU    01000000B    ; RECEIVE-MODE    "     "    .
0020          = 795 XPTT    EQU    00100000B    ; PUSH-TO-TALK RELAY ENABLE.
0010          = 796 XHORN   EQU    00010000B    ; HORN ENABLE.
0008          = 797 XKPAWK  EQU    00001000B    ; KEEP-AWAKE ENABLE.
0004          = 798 XTTSEL  EQU    00000100B    ; TOUCH-TONE SELECT JUMPER.
```

```
LOC  OBJ        LINE        SOURCE STATEMENT

0002          = 799  X20PPS   EQU   00000010B    ; 20-PPS DIALING SELECT JUMPER.
0001          = 800  XCLRST   EQU   00000001B    ; CALL LIGHT RESET.
              = 801  ;
000B          = 802  XSTAR    EQU   11           ; CODE FOR '*'.
000C          = 803  XPOUND   EQU   12           ; CODE FOR '#'.
000D          = 804  XCLEAR   EQU   13           ; CODE FOR '*#'.
              = 805  ;
00AA          = 806  XFRMW0   EQU   0AAH         ; ANI FRAMING WORD 0.
00B4          = 807  XFRMW1   EQU   0B4H         ;   "       "     " 1.
0033          = 808  XFRMW2   EQU   033H         ;   "       "     " 2.
              = 809  ;
00CB          = 810  KTMLIM   EQU   29*7         ; SEVEN-SECOND TIMEOUT.
                811
                812          END

USER SYMBOLS
AMERCA 03DF   ANIAD0 01A6   ANILP0 015F   ANILP1 0175   ANIOUT 0154   ANISOA 01B0
ANISOB 01B2   ANISBO 01AE   BUSLP0 01D6   BUSLP1 01D8   BUSY   01CC   CHIMES 03B0
CHKSUM 003E   CK2805 034F   CK2AD0 035D   CK2AD1 035F   CK2AD2 036D   CK2LP0 0357
CYCTBL 00EC   DECAD0 0042   DECAD1 004D   DECAD2 005C   DECAD3 0063   DECAD4 0070
DECAD5 0076   DECAD6 0083   DECAD7 008A   DECAD8 0088   DECAD9 004B   DECLP0 0026
DECLP1 0028   DECLP2 002C   DECLP3 0030   DECLP4 004E   DECLP5 0052   DECODE 0020
DELAY  02C8   DELLP0 02C9   DIXIE  0392   ENCAD0 0115   ENCAD1 0128   ENCAD2 012A
ENCLP0 010C   ENCLP1 011F   ENCODE 0106   FLAG   003F   HAMCOD 037C   INTLZE 00F9
KBDAD0 0218   KBDAD1 0221   KBDAD2 0223   KBDAD3 0234   KBDAD4 0256   KBDINP 01F1
KBDLP0 0243   KBDLP1 0236   KBDSOA 0259   KBDSOB 0264   KBDSOC 026F   KBDSB0 0257
KEYAD0 034C   KEYAD1 034E   KEYCHK 0343   KEYTBL 036E   KEYTBX 037C   KTMLIM 00CB
LANDH  03CD   NUMBUF 0020   PCHTBL 00DF   PLSAD0 02AE   PLSLP0 027C   PLSLP1 0290
PLSOUT 0272   PLSSOA 02B6   PLSSB0 02B4   RDPAD0 0341   RDPHN0 0314   RDPLP0 031A
RDPLP1 0326   RINAD0 00B6   RINAD1 00D0   RINAD2 00D7   RINAD3 00DD   RINGER 008E
RINLP0 00A0   RINLP1 00AA   RINLP2 00BB   SAAHC  03A3   SCRTBL 0389   SLEEP  02D1
THRAD0 000C   THRINT 0007   TTOAD0 0152   TTOLP0 013B   TTOUT  0131   WAKEUP 000D
WAKLP0 000F   WARAD0 02E9   WARBLE 02D7   WARLP0 02DB   WARLP1 02EB   WARLP2 02ED
WARLP3 0301   WARSB0 0309   WLTELL 03BA   X1STKY 0010   X20PPS 0002   X2805D 0020
X2805T 0040   XAUDRX 0040   XAUDTX 0080   XCLEAR 000D   XCLRST 0001   XFRMW0 00AA
XFRMW1 00B4   XFRMW2 0033   XHORN  0010   XKPAWK 0008   XPOUND 000C   XPRANI 0080
XPRVST 0008   XPTT   0020   XRNGSL 007F   XSTAR  000B   XTTSEL 0004
```

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An automatic radio telephone encoder/decoder of the type which encodes and decodes telephone dialing codes on an audio dialing code carrier tone, comprising:
   means for generating telephone dialing codes;
   a microcomputer programmed to encode telephone dialing codes for transmission in response to inputs from said means for generating telephone dialing codes, including means for reading said telephone dialing codes as individually presented key inputs, means for determining the relative sequence of said key inputs of a group of said individually presented key inputs and generating command signals in response to predetermined relative sequences, and to decode received telephone dialing codes, including means for reading a pulse encoded sequence of digits and matching said digits to a preset code, means for time limiting said matching function, means for generating first command functions if said match is achieved or second command functions if said match is not achieved; and
   means to automatically turn on said microcomputer for a predetermined period of time.

2. An automatic radio telephone encoder/decoder as defined in claim 1, wherein said means to automatically turn on said microcomputer is activated by the commencement of a received dialing code carrier tone.

3. An automatic radio telephone encoder/decoder as defined in claim 2 wherein said predetermined period of time is three seconds.

4. An automatic radio telephone encoder/decoder as defined in claim 3, comprising:
   means to repeat said three second predetermined time period in response to a dialing code pulse received within an immediately preceding three second predetermined time period...

5. An automatic radio telephone encoder/decoder as defined in claim 3, comprising:
   means to immediately terminate said three second time period when a digit in said received dialing code does not agree with the dialing code said computer has been adapted to decode.

6. An automatic radio telephone encoder/decoder as defined in claim 1 wherein said means for generating telephone dialing codes is a keyboard and said means to automatically turn on said microcomputer is activated by depression of a key on said keyboard.

7. An automatic radio telephone encoder/decoder as defined in claim 6 wherein said predetermined time period is seven seconds.

8. An automatic radio telephone encoder/decoder as defined in claim 7 wherein said keyboard responsive means to automatically turn on said microcomputer is disabled during receipt of a dialing code carrier tone.

9. An automatic radio telephone encoder/decoder as defined in claim 8 comprising means to override said disabling means.

10. An automatic radio telephone encoder/decoder as defined in claim 1 wherein said means to automatically turn on said microcomputer is activated by the commencement of a received dialing code carrier tone or activation of a key on said keyboard input means.

11. An automatic radio telephone encoder/decoder as defined in claim 10 wherein said predetermined time period is three seconds when said microcomputer is activated by the commencement of a received dialing code carrier tone and seven seconds when said microcomputer is activated by activation of a key on said keyboard input means.

12. An automatic radio telephone encoder/decoder as defined in claim 1, comprising:
a first indicator means for providing a visual indication of the presence of a push-to-talk enabling signal;
a second indicator means for providing a visual indication of the presence of a received dialing code carrier tone; and
a third indicator means for providing a visual indication of said microcomputer successfully decoding an incoming dialing code.

13. An automatic radio telephone encoder/decoder as defined in claim 12 wherein said first, second, and third indicator means comprise light emitting diodes.

14. An automatic radio telephone encoder/decoder as defined in claim 12 wherein said first indicator means provides a green visual indication, said second indicator means provides a red visual indication, and said third indicator means provides a yellow visual indication.

15. An automatic radio telephone encoder/decoder as defined in claim 12 wherein said first, second, and third indicator means are located on said keyboard input means.

16. An automatic radio telephone encoder/decoder as defined in claim 1, comprising:
means to periodically energize the transmitter of the associated radio telephone for a predetermined time period.

17. An automatic radio telephone encoder/decoder as defined in claim 16 wherein said means to periodically energize the transmitter of the associated radio telephone provides a periodic push-to-talk control signal at a repetition rate less than the automatic COR drop out period of the associated automatic radio telephone system.

18. An automatic radio telephone encoder/decoder as defined in claim 17, comprising:
means responsive to an output of said microcomputer for turning on said means to periodically energize the transmitter.

19. An automatic radio telephone encoder/decoder as defined in claim 17, comprising:
means responsive to an output of said microcomputer for synchronizing said means to periodically energize the transmitter.

20. An automatic radio telephone encoder/decoder as defined in claim 17 wherein said push-to-talk control signal is a pulse having a pulse width of 500 milliseconds or greater.

21. An automatic radio telephone encoder/decoder as defined in claim 1, comprising means to provide a selected ring tone from a plurality of different ring tones including groups of musical notes representing different musical compositions in response to said microcomputer decoding a telephone dialing code.

22. An automatic radio telephone encoder/decoder as defined in claim 1, comprising means to generate an audio signal in response to each depression of a key on said keyboard input means.

23. An automatic radio telephone encoder/decoder, comprising:
a microcomputer programmed to encode and decode telephone dialing codes, including means for reading said telephone dialing codes as individually presented key inputs, means for determining the relative sequence of said key inputs of a group of said individually presented key inputs and generating command signals in response to predetermined relative sequences, means for reading a pulse encoded sequence of digits and matching said digits to a preset code, means for time limiting said matching function, means for generating first command functions if said match is achieved or second command functions if said match is not achieved;
first filter means for passing only the dialing code carrier tone from the associated radio telephone to the encoder/decoder; and
second filter means for passing all audio frequencies except the frequency of the dialing code carrier tone from the encoder/decoder back to the associated radio telephone.

24. An automatic radio telephone encoder/decoder as defined in claim 23, comprising a tone decoder driven by the output of said first filter means.

25. An automatic radio telephone encoder/decoder as defined in claim 24, comprising:
means to couple the output of said tone decoder to said microcomputer as a dial code signal.

26. An automatic radio telephone encoder/decoder as defined in claim 25, comprising:
means responsive to the initial transition of the output of said tone decoder which occurs when a dialing code carrier tone is initially received for automatically turning on said microcomputer.

27. An automatic radio telephone encoder/decoder as defined in claim 25, including means to provide a busy indication and inhibit the generation of push-to-talk control functions in response to a constant output from said tone decoder in the absence of said microcomputer decoding a telephone dialing code.

28. An automatic radio telephone encoder/decoder as defined in claim 25, comprising:
means to mute said second filter means in response to said tone decoder providing a constant output in response to a telephone dialing code carrier tone in the absence of said microcomputer decoding a telephone dialing code.

29. An automatic radio telephone encoder/decoder as defined in claim 24, comprising means to couple audio tones from said microcomputer to said second filter means.

30. An automatic radio telephone encoder/decoder as defined in claim 29 wherein said audio tones coupled from said microcomputer comprise a selected one of a plurality of ring tones, busy tones and key activation indication tones.

31. An automatic radio telephone encoder/decoder as defined in claim 1 wherein said means to automatically turn on said microcomputer for a predetermined time period is adapted to turn on said microcomputer when the services of said microcomputer are required to decode an incoming dialing code or encode an outgoing dialing code.

32. An automatic radio telephone encoder/decoder as defined in claim 1 wherein said microcomputer is a type 8048 microcomputer.

33. An automatic radio telephone encoder/decoder as defined in claim 4, comprising: means to disable said means to repeat said predetermined period of time after the receipt of the start of said dialing code carrier tone when said dialing code carrier tone does not contain dialing code data.

34. An automatic radio telephone encoder/decoder as defined in claim 2, comprising: means to immediately terminate said predetermined period of time when a digit in said received dialing code does not agree with the dialing code said computer has been adapted to decode.

35. An automatic radio telephone encoder/decoder comprising:
   means for generating telephone dialing codes;
   a microcomputer programmed to encode telephone dialing codes for transmission in response to inputs from said means for generating telephone dialing codes, and to decode received telephone dialing codes;
   means to automatically turn on said microcomputer for a predetermined period of time;
   a first filter means including an operational amplifier for selectively passing a telephone dialing code carrier audio frequency;
   a second filter means for selectively passing all audio frequencies except the telephone dialing code carrier tone;
   a type L567 tone decoder having an input coupled to an output of said first filter means;
   a first light emitting diode for providing a visual indication of transmitter activation;
   a second light emitting diode for indicating a busy radio telephone channel;
   NOR logic means responsive to an output of said tone decoder for energizing said first and second light emitting diodes in a mutually exclusive manner;
   a third light emitting diode for providing a visual indication of the succesful decoding by said microcomputer of said dialing code; and
   a NOR logic flip-flop responsive to an output of said microcomputer indicative of said microcomputer successfully decoding an incoming dialing code for inhibiting the operation of said second light emitting diode and energizing said third light emitting diode.

36. An automatic radio telephone encoder/decoder as defined in claim 35 wherein said means to automatically turn on said microcomputer for a predetermined period of time comprises:
   a regulated power source;
   a transistor switching means for controlling the application of power from said regulated power supply to said microcomputer;
   a NOR gate adapted to normally hold said transistor in a non-conductive state;
   a NAND logic circuit driven by said keyboard input means and said tone decoder for causing said NOR gate to turn on said transistor at the initial transition from high to low of the output of said tone decoder or the activation of a key on said keyboard in the absence of a low potential from said tone decoder being applied to said NAND logic circuit;
   means to couple a timed controlled signal to said NOR gate from said microcomputer for causing the output of said NOR gate to maintain said transistor in a conductive condition for a predetermined period of time; and
   capacitor means coupled between a common output of all of the keys of said keyboard and said transistor whereby said transistor may be rendered conductive irrespective of the condition of said NOR gate or NAND logic circuit in response to the activation of any key on said keyboard.

37. An automatic radio telephone encoder/decoder as defined in claim 36 wherein said means for generating telephone dialing codes comprises a keyboard and said NAND logic circuit comprises:
   a NAND gate having a first and second input; means to couple said first input of said first NAND gate to the output of said tone decoder;
   an RC network coupled to said second input of said first NAND gate for causing said NAND gate to produce a low output a predetermined time after said transistor switching means is maintained in a conductive state;
   a diode coupling the output of said first NAND gate to an input of said NOR gate common with the input from said microcomputer for inhibiting the effect of said microcomputer output on said NOR gate;
   a second NAND gate including a first input coupled to the output of said tone decoder and a second input coupled to all of the keys of said keyboard; and
   a capacitor means coupling the output of said second NAND gate to an input of said NOR gate.

* * * * *